US010882040B2

(12) United States Patent
Schaffhauser

(10) Patent No.: US 10,882,040 B2
(45) Date of Patent: Jan. 5, 2021

(54) INTERFACE COMPONENT FOR A MICROFLUIDIC DEVICE, ASSEMBLIES, AND METHOD FOR EXTRACTING PARTICLES FROM A SAMPLE

(71) Applicant: RQMICRO AG, Schlieren (CH)

(72) Inventor: Daniel Schaffhauser, Hergiswil (CH)

(73) Assignee: RQMICRO AG, Schlieren (CH)

( * ) Notice: Subject to any disclaimer, the term of this patent is extended or adjusted under 35 U.S.C. 154(b) by 248 days.

(21) Appl. No.: 15/778,581

(22) PCT Filed: Nov. 30, 2015

(86) PCT No.: PCT/IB2015/059220
§ 371 (c)(1),
(2) Date: May 23, 2018

(87) PCT Pub. No.: WO2017/093781
PCT Pub. Date: Jun. 8, 2017

(65) Prior Publication Data
US 2018/0353953 A1 Dec. 13, 2018

(51) Int. Cl.
*G01N 1/10* (2006.01)
*B01L 3/00* (2006.01)

(52) U.S. Cl.
CPC ..... *B01L 3/50273* (2013.01); *B01L 3/502715* (2013.01); *B01L 2200/027* (2013.01);
(Continued)

(58) Field of Classification Search
CPC ........... B01L 3/50273; B01L 3/502715; B01L 2200/027; B01L 3/00; G01N 1/10
See application file for complete search history.

(56) References Cited

U.S. PATENT DOCUMENTS

2002/0048536 A1 4/2002 Bergh et al.
2003/0148342 A1 8/2003 Gau
(Continued)

FOREIGN PATENT DOCUMENTS

WO WO-0163270 A1 8/2001

OTHER PUBLICATIONS

International Search Report and Written Opinion for PCT/IB2015/059220 dated Oct. 18, 2016, 8 pages.

*Primary Examiner* — Brian J. Sines
(74) *Attorney, Agent, or Firm* — Blank Rome LLP

(57) ABSTRACT

An interface component (40), suitable for cooperating with a microfluidic device (1), the interface component comprising, one or more elements (41) which can be selectively connected to a pneumatic system (71 *a*,71 *b*) which can provide a positive and/or negative air flow to the one or more elements (41); wherein each of the one or more elements (41) comprises, an input port (42) which can be selectively fluidly connected to a pneumatic system (71 *a*,71 *b*); and a flow restrictor (43) according to a further aspect of the present invention; the flow restrictor (43) being arranged in fluid communication with the input port (42), wherein the flow restrictor (43) can restrict the flow of fluid through the element (41); and an aerosol filter (49) which is arranged to be in fluid communication with the flow restrictor (43); and wherein the interface component (40) further comprises one or more outlets (45), each of the one or more outlets (45) being in fluid communication with a respective element (41), so that fluid can flow from the element (41) out of the interface component (40) via the one or more outlets (45); and wherein each of the one or more outlets (45) can be selectively arranged to be in fluid communication with a respective reservoir (105,106,107,108) of a microfluidic device (1). There is further provided a corresponding
(Continued)

method and assembly for extracting ferromagnetic, paramagnetic and/or diamagnetic particles from a sample.

8 Claims, 11 Drawing Sheets

(52) U.S. Cl.
CPC ... *B01L 2300/0681* (2013.01); *B01L 2300/14* (2013.01); *B01L 2400/0478* (2013.01); *B01L 2400/0487* (2013.01); *B01L 2400/0655* (2013.01); *B01L 2400/082* (2013.01)

(56) References Cited

U.S. PATENT DOCUMENTS

| | | | | |
|---|---|---|---|---|
| 2014/0087359 | A1 | 3/2014 | Njoroge et al. | |
| 2014/0107589 | A1 | 4/2014 | Amirouche | |
| 2015/0301033 | A1* | 10/2015 | Guo | C12Q 1/6834 506/9 |
| 2018/0169654 | A1* | 6/2018 | Archibald | G01N 33/15 |
| 2019/0030533 | A1* | 1/2019 | Shachar | G01N 29/036 |
| 2019/0234399 | A1* | 8/2019 | Karunaratne | F04B 39/08 |

* cited by examiner

INTERFACE COMPONENT FOR A MICROFLUIDIC DEVICE, ASSEMBLIES, AND METHOD FOR EXTRACTING PARTICLES FROM A SAMPLE

RELATED APPLICATIONS

This application is a national phase of PCT/IB2015/059220, filed on Nov. 30, 2015. The entire contents of this application is hereby incorporated by reference.

FIELD OF THE INVENTION

The present invention concerns an interface component which is suitable for cooperating with a microfluidic device which can be used to extract ferromagnetic, paramagnetic (including super-paramagnetic), and/or diamagnetic particles from a sample. There is further provided corresponding assemblies and a corresponding method of extracting ferromagnetic, paramagnetic (including super-paramagnetic), and/or diamagnetic particles from a sample.

DESCRIPTION OF RELATED ART

Existing techniques of extracting ferromagnetic, paramagnetic (including super-paramagnetic), and/or diamagnetic particles from a sample involve moving said particles laterally, using a magnetic field, from the sample into a buffer solution. Specially sample and buffer solutions flow simultaneously along a channel of a microfluidic device; the channel of a microfluidic device has a planar channel bed (e.g. the channel has a rectangular cross section), and the particles are moved from the sample into the buffer solution, in a direction which is parallel to the planar channel bed. In some cases the channel of the microfluidic device has a curved channel bed in which case the particles are moved in a direction which is parallel to a tangent to the apex of the curve of the channel bed. However existing solutions for extracting ferromagnetic, paramagnetic (including super-paramagnetic), and/or diamagnetic particles from a sample suffer from low throughput.

Also magnetic field which is used to move the particles from the sample into a buffer solution is provided by magnetized or magnetizable structures which are integral to the microfluidic device. Having magnetized or magnetizable structures integral to the microfluidic device increases the manufacturing costs of the microfluidic device. In order to be able to move the particles parallel to the planar channel bed the magnetized or magnetizable structures need be precisely positioned in the microfluidic devices so that their magnetic field gradient is parallel to the planar channel bed. In practice, the size of the magnetized or magnetizable structures is proportional to the magnetic force that can be applied to the particles; therefore to ensure effective extraction of ferromagnetic, paramagnetic (including super-paramagnetic), and/or diamagnetic particles from the sample into a buffer solution, large magnetized or magnetizable structures need to be integrated to the microfluidic device, which in turn increases the dimensions of the microfluidic device.

There is a need in the art to provide an interface component which can be used with a suitable microfluidic device which can achieve improved extraction ferromagnetic, paramagnetic (including super-paramagnetic), and/or diamagnetic particles from a sample.

The present invention aims to obviate or mitigate at least some of the disadvantages associated with the existing solutions for extracting ferromagnetic, paramagnetic (including super-paramagnetic), and/or diamagnetic particles from a sample.

BRIEF SUMMARY OF THE INVENTION

According to one aspect of the present invention there is provided a microfluidic device comprising, a pallet, having a first surface and second, opposite, surface; the first surface having defined therein, a main channel, and one or more inlet subsidiary channels each of which is in fluid communication with the main channel at a first junction which is located at one end of the main channel, and corresponding one or more outlet subsidiary channels each of which is in fluid communication with the main channel at a second junction which is located an second, opposite, end of the main channel; wherein the depth of the one or more inlet subsidiary channels and the depth of the one or more outlet subsidiary channels is less than the depth of the main channel so that there is step defined at the first junction and at the second junction; the second, opposite, surface having defined therein a groove which can receive a means for generating a magnetic field, wherein the groove is aligned with, and extends parallel to, the main channel.

The depth of the one or more inlet subsidiary channels may be equal to the depth of the one or more outlet subsidiary channels.

Two inlet subsidiary channels may be provided, which are arranged to join the main channel at opposite sides of the main channel, at the first junction; and two outlet subsidiary channels may be provided which are arranged to join the main channel at opposite sides of the main channel, at the second junction.

Two inlet subsidiary channels may be provided and two outlet subsidiary channels may be provided, and wherein the lengths of the two inlet subsidiary channels are equal and the length of the two outlet subsidiary channels are equal.

The length of the main channel between the first junction and second junction may be equal to half the length of an inlet subsidiary channel.

Preferably the length of the main channel between the first junction and second junction may be between 1-50 mm. Most preferably the length of the main channel between the first junction and second junction is 20 mm.

The ratio between a width and depth of the main channel may be between 0.2 and 5.

The microfluidic device may further comprise a film which overlays the first surface so as to overlay the main channel, the one or more inlet subsidiary channels and the one or more outlet subsidiary channels, so as to confine the flow of fluids to within the respective channels. The film may be removably attached to the first surface.

The length of the groove may be equal to the length the length of the main channel.

The centre of the groove is aligned with the centre of the main channel.

The groove may have a tapered cross section.

The groove may have a tapered cross section with a rounded apex. The rounded apex of the groove may have a radius of curvature between 0.05 mm-0.5 mm. Preferably the rounded apex of the groove will have a radius of curvature of 0.2 mm.

The groove may have a tapered cross section with a planar base For example the groove may have a cross section which has the shape of a truncated triangle.

The groove may have a v-shaped cross section.

The thickness of the pallet between the groove and main channel is between 0.01 mm-10 mm. Preferably the thickness of the pallet between the groove and main channel is between 0.15 mm.

The microfluidic device may comprise a buffer source reservoir which is arranged in fluid communication with the main channel, and which can hold a buffer liquid which is to be fed into the main channel.

The microfluidic device may comprise a sample source reservoir which is arranged in fluid communication with the one or more inlet subsidiary channels, and which can hold a sample liquid which is to be fed into the one or more inlet subsidiary channels.

The microfluidic device may comprise a buffer drain reservoir which is arranged in fluid communication with the main channel, and which can receive a buffer liquid which has flown along the main channel.

The microfluidic device may comprise a sample drain reservoir which is arranged in fluid communication with the one or more outlet subsidiary channels, and which can hold a sample liquid which has flown along the one or more outlet subsidiary channels.

The thickness of the pallet between the groove and main channel may be between 0.01-0.2 mm.

The pallet may be composed of transparent material.

According to a further aspect of the present invention there is provided a method of extracting ferromagnetic, paramagnetic and/or diamagnetic particles from a sample, the method comprising the steps of, providing a microfluidic device according to any one of the above-mentioned microfluidic devices;

providing a sample which comprises ferromagnetic, paramagnetic and/or diamagnetic particles, which flows along the one or more inlet subsidiary channels and along the main channel;

providing a buffer which flows along the main channel;

wherein the sample and buffer simultaneously flow along the main channel;

applying a magnetic field to the sample which flows in the main channel, wherein the magnetic field moves said particles from a sample into the buffer;

receiving the sample, which is substantially absent of said particles, into the one or more outlet subsidiary channels;

collecting the buffer, which contains said particles.

The step of applying a magnetic field to the sample may comprise, moving a means for generating a magnetic field into said groove of the pallet of the microfluidic device.

The step of applying a magnetic field to the sample may comprise, providing a magnetic field which moves said particles out of a sample into the buffer, in a direction which is, perpendicular a channel bed of the main channel if the channel bed in planar, or, perpendicular to a tangent to an apex of the channel bed of the main channel if the channel bed is curved.

The step of applying a magnetic field to the sample may comprise, providing a magnetic field which moves said particles out of a sample into the buffer, in a direction which is, both perpendicular to the direction of flow of the sample and buffer along the main channel and either, perpendicular a channel bed of the main channel if the channel bed in planar, or, perpendicular to a tangent to an apex of the channel bed of the main channel if the channel bed is curved.

The method may comprise the step of adjusting the flow rate of the sample and buffer so that the flow rates of the sample and buffer are equal along the main channel.

The method may comprise the step of adjusting the flow rate of the sample and buffer so that the ratio between flow rates of sample in the inlet subsidiary channels and buffer in main channel at the first junction is between 0.1-10. Most preferably said ratio is between 0.5-2. In one embodiment the flow rate of the sample is twice that of the buffer at the first junction. In another example the flow rate of the buffer is twice that of the sample at the first junction.

The method may comprise the step of adjusting the flow rate of the sample and buffer so that the ratio between flow rates of sample in the outlet subsidiary channels and buffer in main channel at the second junction is between 0.1-10. Most preferably said ratio is between 0.5-2. In one embodiment the flow rate of the sample is twice that of the buffer at the second junction. In another example the flow rate of the buffer is twice that of the sample at the second junction.

According to a further aspect of the present invention there is provided an assembly comprising a microfluidic device according to any one of the above-mentioned microfluidic devices, and a means for generating a magnetic field located in the groove of the pallet.

The means for generating a magnetic field may be a permanent magnet which has a triangular shaped cross section.

The means for generating a magnetic field may have a shape corresponding to the shape of the groove in the pallet.

The means for generating a magnetic field may extend over a length which is at least equal to the length of the main channel in the microfluidic device.

The means for generating a magnetic field is preferably arranged so that its magnetization is perpendicular to a planar channel bed of the main channel. The means for generating a magnetic field is preferably arranged so that its magnetization is perpendicular to a tangent to an apex of a cross section of the channel bed (e.g. when the channel bed of the main channel is curved; or when the channel has a v-shaped cross section)

The means for generating a magnetic field is preferably arranged so that its magnetization is perpendicular to the direction flow of the sample and buffer in the main channel.

The means for generating a magnetic field may has a tapered cross section.

The means for generating a magnetic field may has a tapered cross section with a rounded tip. The rounded tip of the means for generating a magnetic field may have a radius of curvature between 0.05 mm-0.5 mm. Preferably the rounded tip of the means for generating a magnetic field may have a radius of curvature of 0.2 mm.

The means for generating a magnetic field has a tapered cross section with a flat apex; For example the means for generating a magnetic field may have a cross section which has the shape of a truncated triangle.

The means for generating a magnetic field may have a triangular cross section.

The means for generating a magnetic field may have a constant cross sectional shape along a length which is equal to, or greater than, the length of the main channel.

The means for generating a magnetic field may be a permanent magnet.

According to a further aspect of the present invention there is provided an interface component, suitable for cooperating with a microfluidic device, the interface component comprising, one or more elements which can be selectively connected to a pneumatic system which can provide a positive or negative air flow to the one or more element, wherein each of the one or more elements comprises, an input port which can be selectively fluidly connected to a pneumatic system; a flow restrictor arranged in fluid communication with the input port, wherein the flow restrictor can restrict the flow of fluid through the element; and an aerosol filter which is arranged to be in fluid communication with the flow restrictor; and wherein the interface component further comprises one or more outlets, each of the one or more outlets being in fluid communication with a respective element, so that fluid can flow from the element out of the interface component via the one or more outlets; and wherein each of the one or more outlets can be selectively arranged to be in fluid communication with a respective reservoir of a microfluidic device.

Preferably the interface component is suitable for cooperating with any of the above mentioned microfluidic devices.

The interface component may comprise at least four elements, and at least four outlets.

The aerosol filter may comprise hydrophobic material.

The aerosol filter may comprise pores having a size in the range 0.1-0.3 μm. Preferably the aerosol filter may comprises pores having a size 0.22 μm.

The interface component may further comprise one or more magnetic assemblies. Each of the magnetic assemblies may comprise a permanent magnet.

Each of the magnetic assemblies may comprise, a plunger, having a shaft wherein one end of the shaft is connected to a means for generating a magnetic field;

a biasing means which biases the shaft in a first direction; and an electromagnet, which cooperates with the shaft, such that operating the electromagnet forces the shaft to move against in a second, opposite, direction, against the biasing force of the biasing means.

Preferably the interface component comprises a platform on which the one or more magnetic assemblies are supported and on which the one or more elements are supported. When the shaft is moved in the second direction the means for generating a magnetic field is moved in a direction which is away from the platform. When the shaft is moved in a first diction the means for generating a magnetic field is moved in a direction towards the platform.

Preferably the interface component comprises a plurality of magnetic assemblies arranged in a row on the platform. For example the interface component may comprise a four magnetic assemblies arranged in a row on the platform. Preferably a plurality of elements are located on one side of the row and a plurality of elements are located on the other side of the row.

The means for generating a magnetic field may have a tapered cross section.

The means for generating a magnetic field may has a tapered cross section with a rounded tip. The rounded tip of the means for generating a magnetic field may have a radius of curvature between 0.05 mm-0.5 mm. Preferably the rounded tip of the means for generating a magnetic field may have a radius of curvature of 0.2 mm.

The means for generating a magnetic field has a tapered cross section with a flat apex; For example the means for generating a magnetic field may have a cross section which has the shape of a truncated triangle.

The means for generating a magnetic field may have a triangular cross section.

The means for generating a magnetic field may have a constant cross sectional shape along a length which is equal to, or greater than, the length of the main channel.

The means for generating a magnetic field may be a permanent magnet. The permanent magnet may have a length which is between 1-50 mm. Preferably the permanent magnet has a length of 20 mm. Preferably the permanent magnet has a constant cross section along the whole length of the permanent magnet.

The shaft of the plunger may be connected to said means for generating a magnetic field by at least two pin members which pass through holes defined in the pallet of the interface component. The at least two ping will help to ensure that the means for generating a magnetic field is prevented from rotating around a longitudinal axis of the magnetic assembly.

According to a further aspect of the present invention there is provided an assembly comprising, a microfluidic device according to any one of the above-mentioned microfluidic devices; and a interface component according to any one of the above-mentioned interface components;

wherein one or more of the outlets of the interface component are arranged to be in fluid communication with a respective reservoir of the microfluidic device.

The assembly may further comprises a pneumatic system which is operable to provide a positive air flow. The assembly may further comprises a pneumatic system which is operable to provide a negative air flow.

The interface component may comprise a row of magnetic assemblies, and elements located on opposite sides of the row of magnetic assemblies. The elements located on one side of the row may be fluidly connected to a pneumatic system which is operable to provide a positive air flow; and the elements which are located on the other opposite side of the row may be fluidly connected to a pneumatic system which is operable to provide a negative air flow.

Each of the one or more outlets are arranged to be in fluid communication with a respective reservoir of a microfluidic device.

At least one outlet is in fluid communication with a sample source reservoir. An element which is in fluid communication with said at least one outlet is fluidly connected to a pneumatic system which is operable to provide a positive air flow.

At least one outlet is in fluid communication with a buffer source reservoir. An element which is in fluid communication with said at least one outlet is fluidly connected to a pneumatic system which is operable to provide a positive air flow.

At least one outlet is in fluid communication with a sample drain reservoir. An element which is in fluid communication with said at least one outlet is fluidly connected to a pneumatic system which is operable to provide a negative air flow.

At least one outlet is in fluid communication with a buffer drain reservoir. An element which is in fluid communication with said at least one outlet is fluidly connected to a pneumatic system which is operable to provide a negative air flow.

According to a further aspect of the present invention there is provided a method of extracting ferromagnetic particles from a sample, further comprising providing a microfluidic device according to any one of the above-mentioned microfluidic devices; providing a sample which comprises ferromagnetic, paramagnetic and/or diamagnetic particles into a reservoir of the microfluidic device; providing a buffer in a reservoir of the microfluidic device; providing a interface component according to any one of the above mentioned a interface component, in cooperation with the microfluidic device so that one or more of the outlets are arranged to be in fluid communication with a respective reservoir of the microfluidic device connecting a pneumatic system to each of the one or more elements of the interface component; and operating the pneumatic system to provide a positive air pressure and/or negative air pressure in each of the one or more elements, to cause the sample to flow along the one or more inlet subsidiary channels and along the main channel and to cause the buffer to flow along the main channel; operating an electromagnet of the interface component to cause the shaft of the plunger to move against a biasing means, and to move the permanent magnet into the groove of the microfluidic device so that a magnetic field is applied to the sample which flows in the main channel, wherein the magnetic field moves said particles from a sample into the buffer;

receiving the sample, which is substantially absent of said particles, into the one or more outlet subsidiary channels; collecting the buffer, which contains said particles.

According to a further aspect of the present invention there is provided a flow restrictor suitable for use in any of the above-mentioned interface components, the flow restrictor comprising, an inlet member which has an inlet channel defined therein;

an outlet member which has an outlet channel defined therein;

wherein the inlet channel and outlet channel are fluidly connected; and a capillary member which comprises an intermediate channel which is located between the inlet and outlet members, and wherein the intermediate channel is in fluid communication with the inlet channel and outlet channel; and wherein the intermediate channel has dimensions smaller than the dimensions of the inlet and outlet channels.

Preferably the intermediate channel has a circular cross section and has a diameter which is between 1-100 μm.

Preferably the capillary member is composed of transparent material such as glass for example.

The flow restrictor may comprises a male member and female member which are configured so that they can mechanically cooperate with each other so that the male and female members can be fixed together;

wherein the male member comprises the inlet member, and the female member comprises the outlet member;

wherein the male and female member each have a pocket which can receive a portion of the capillary member so that a portion of capillary member is contained within the pocket in the male member, and another portion of the capillary member is contained within pocket of the female member.

The depth of the pocket in the male member is such that when the capillary member is positioned into the pocket such that capillary member abuts a base of the pocket, at least 0.5 mm of the length of the capillary member extends out of the pocket.

Preferably the depth of the pocket in the male member is between 0.5 mm-19.5 mm. Most preferably the depth of the pocket in the male member is 1.5 mm.

The pocket in the male member preferably has a circular cross section. The diameter of the pocket in the male member is preferably between 0.5 mm-5 mm.

Preferably the depth of the pocket in the female member is between 0.5-20 mm. Most preferably the depth of the pocket in the female member is 5 mm.

The pocket in the female member preferably has a circular cross section. The diameter of the pocket in the female member is preferably between 0.5 mm-5 mm.

The capillary member may have length between 2.20 mm. Most preferably the capillary member has a length between 4-8 mm.

Preferably the length of the portion of the capillary member which is contained within pocket of the female member, is at least 0.5 mm.

The flow restrictor may further comprise an o-ring located at an interface between the male and female members.

The male member may further comprise an annular groove defined therein which can receive the o-ring.

The o-ring may be arranged to abut the male member, female member, and capillary member simultaneously.

The capillary member may extend through the o-ring.

The ratio of the cord thickness of the o-ring to the inner diameter of the o-ring may be between 0.1-1. Preferably the ratio of the cord thickness of the o-ring to the inner diameter of the o-ring is 0.5 or 0.8.

The inlet channel may have a circular cross section. The inlet channel may have a diameter in the range 0.2 mm-1.5 mm The outlet channel may have a circular cross section. The outlet channel may have a diameter in the range 0.2 mm-1.5 mm.

The male member may have an external tread, and the female has an internal thread or vice versa.

The male member may further comprise ribbing on an outer surface thereof. The female member may further comprise ribbing on an outer surface thereof.

According to a further aspect of the present invention there is provided a flow restrictor assembly which comprises, a male member which comprises a channel, and which further has a pocket defined therein; and a female member which has a channel defined therein, and which further has a pocket defined therein;

wherein the male member and female member can mechanically cooperate such that the pockets in each member align to define a volume which can receive a capillary member;

a plurality of capillary members each of which has an intermediate channel define therein; wherein the length of each the capillary members is different such that the lengths of their respective intermediate channels are different; and wherein each of the capillary members being dimensioned such that they can be fully contained within the volume defined by the pockets in the male and female members.

BRIEF DESCRIPTION OF THE DRAWINGS

The invention will be better understood with the aid of the description of an embodiment given by way of example and illustrated by the figures, in which:

FIGS. 4*a* and 4*b* provide perspective views of an interface component according to a further aspect of the present invention;

DETAILED DESCRIPTION OF POSSIBLE EMBODIMENTS OF THE INVENTION

Figure 1B:
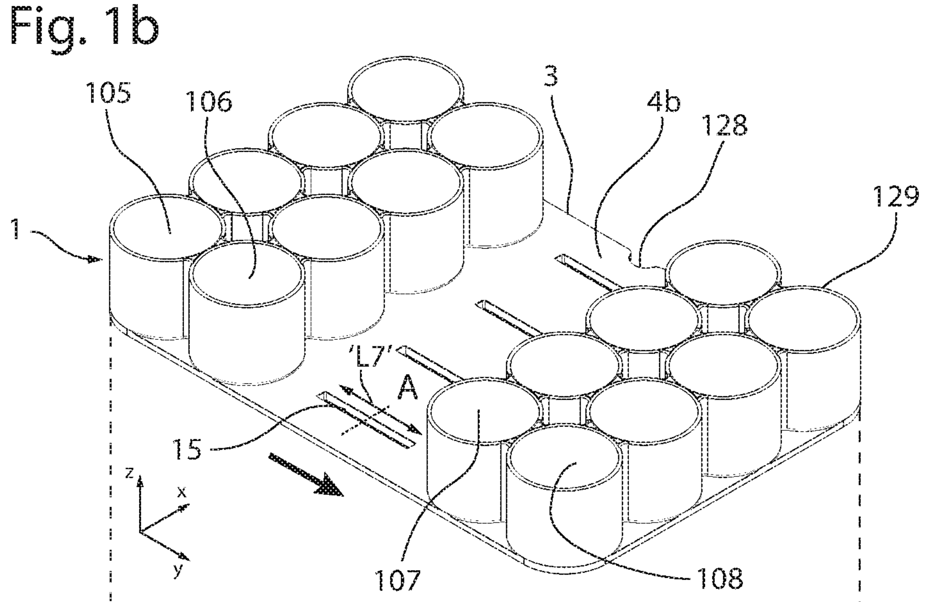
FIGS. 1*a* & 1*b* show a perspective view of a microfluidic device according to an embodiment of the present invention.
Figure 1A:
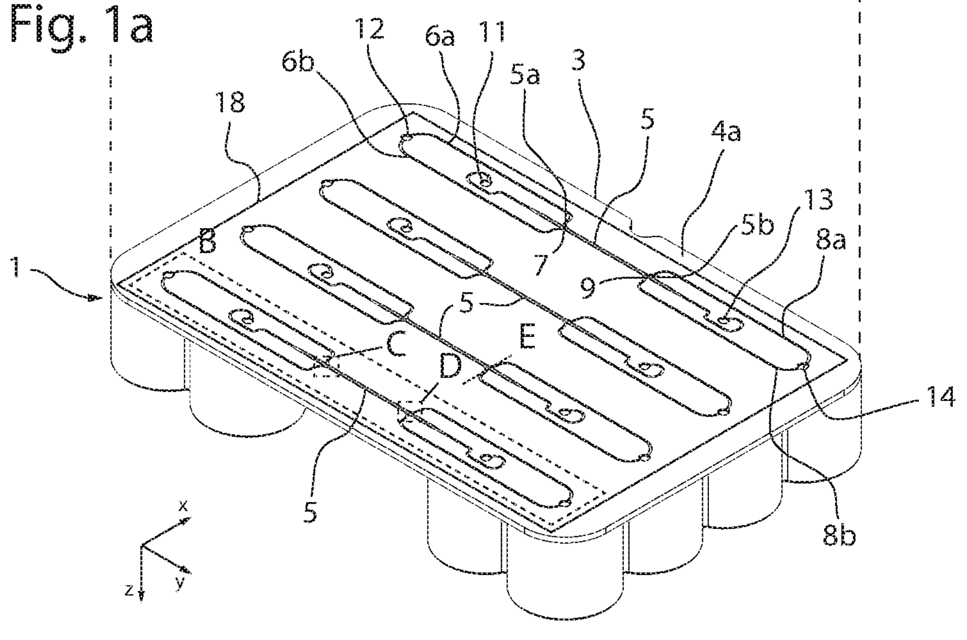

FIGS. 1*a* and 1*b* provide perspective views of a microfluidic device 1 according to an embodiment of the present invention. The microfluidic device 1 comprises a pallet 3 which has a first surface 4*a* and a second, opposite, surface 4*b*. The pallet 3 is composed of transparent material, such as transparent thermoplast. FIG. 1*a* is a perspective view of a microfluidic device 1 showing the first surface 4*a* and FIG. 1*b* is a perspective view of a microfluidic device 1 showing the second, opposite, surface 4*b*.

Referring to FIG. 1*a*, the first surface 4*a* has four main channels 5 defined therein. It will be understood that any number of main channels may be defined in the first surface 4*a*. Each of the main channels 5 a first end 5*a* and a second, opposite, end 5*b*.

For each main channel 5 there is provided are two inlet subsidiary channels 6*a*,6*b*, each of which is in fluid communication with a respective main channel 5 at a first junction 7 which is located at the first end 5*a* of the respective main channel 5. Corresponding two outlet subsidiary channels 8*a*,8*b* each of which is in fluid communication with a respective main channel 5 at a second junction 9 which is located at the second, opposite, end 5*b* of the respective main channel 5. It will be understood that any number of inlet subsidiary channels and any number of outlet subsidiary channels may be provided for each main channel 5; however most preferably the number of inlet subsidiary channels will correspond to the number of outlet subsidiary channels. The two inlet subsidiary channels 6*a*,6*b* mirror one another, and the and two outlet subsidiary channels 8*a*,8*b* mirror one another.

A film 18, overlays the main channels 5, and the respective inlet subsidiary channels 6*a*,6*b* and outlet subsidiary channels 8*a*,8*b* so as to confine the flow of fluids to within the respective channels 5,6*a*,6*b*,8*a*,8*b*. The film 18 is removably attached to (or fixed to) the first surface 4*a* so that it can be selectively removed and attached to the first surface 4*a*. The film is composed of transparent material, such as transparent thermoplast, so as to allow a user to observe the flow of fluids within the microfluidic device 1.

Figure 1C:
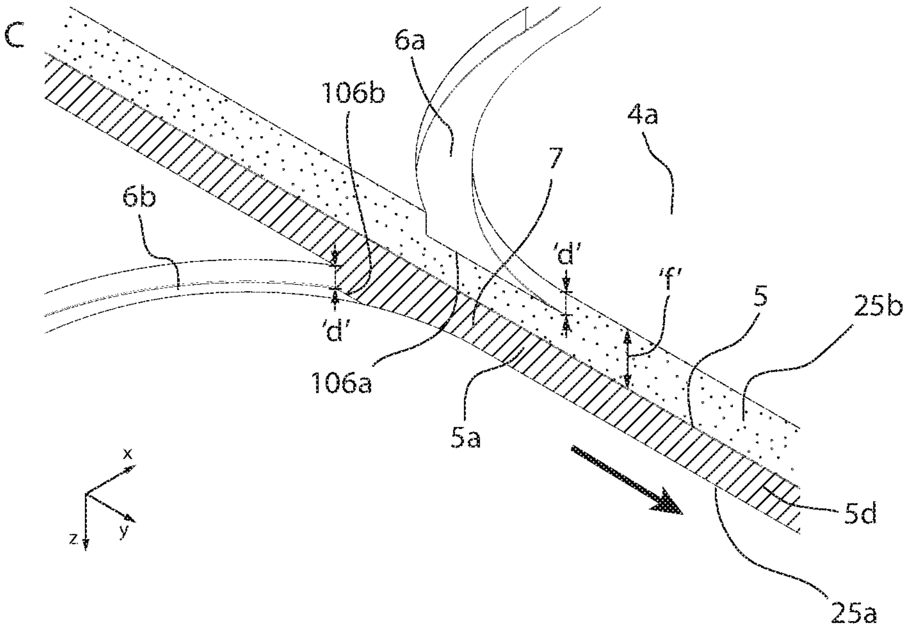
FIG. 1*c* shows a magnified perspective view of a first junction of said microfluidic device.

FIG. 1*c* provides a magnified view of a first junction 7; it will be understood that all of the first junctions 7 in the microfluidic device 1 will have a similar configuration. It can be seen from FIG. 1*c* that the depth 'd' of each of the two inlet subsidiary channels 6*a*,6*b* is less than the depth 'f' of the main channel 5. Accordingly, there are respective steps 106*a*, 106*b* defined at the first junction 7 at the interfaces between each of the inlet subsidiary channels 6*a*,6*b* and the main channel 5. At the first junction 7 the two inlet subsidiary channels 6*a*,6*b* are arranged to join the main channel 5 at opposite sides 25*a*,25*b* of the main channel 5. Both inlet subsidiary channels 6*a*,6*b* join the main channel 5 at the same point along the length of the main channel 5; in that respect it should be understood that in the present invention the first junction 7 is defined by the point along the length of main channel 5 where the two inlet subsidiary channels 6*a*,6*b* meet the main channel 5.

Figure 1F:
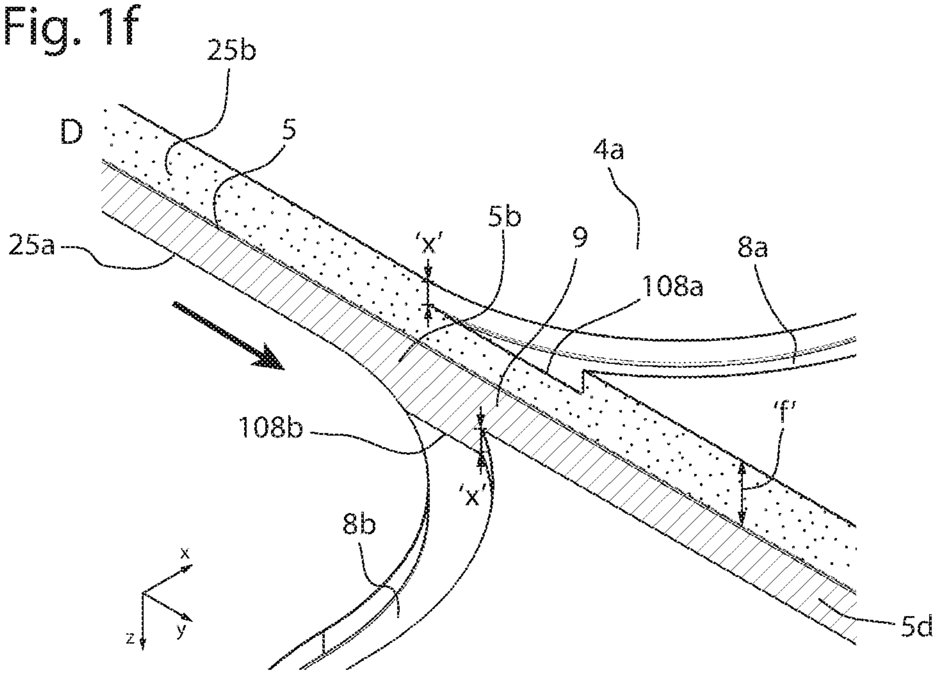
FIG. 1*f* provides a magnified view of a second junction of said microfluidic device.

FIG. 1*f* provides a magnified view of a second junction 9; it will be understood that all of the second junctions 9 in the microfluidic device 1 will have a similar configuration. It can be seen from FIG. 1*f* that the depth 'x' of each of the two outlet subsidiary channels 8*a*,8*b* is less than the depth 'f' of the main channel 5. Accordingly, there are respective steps 108*a*, 108*b* defined at the second junction 9 at the interfaces between each of the outlet subsidiary channels 8*a*,8*b* and the main channel 5. The depth 'x' of each of the two outlet subsidiary channels 8*a*,8*b* is equal to the depth 'd' of the depth 'd' of each of the two inlet subsidiary channels 6*a*,6*b*. At the second junction 9 the two outlet subsidiary channels 8*a*,8*b* are arranged to join the main channel 5 at opposite sides 25*a*,25*b* of the main channel 5. Both outlet subsidiary channels 8*a*,8*b* join the main channel 5 at the same point along the length of the main channel 5; in that respect it should be understood that in the present invention the second junction 9 is defined by the point along the length of main channel 5 where the two inlet subsidiary channels 6*a*,6*b* meet the main channel 5.

Referring to FIG. 1*b* which provides a perspective view of a microfluidic device 1 showing the second, opposite, surface 4*b* of the pallet 3. The second, opposite, surface 4*b* a plurality of grooves 15 defined therein each of which can receive a means for generating a magnetic field (e.g. a magnet). The number of groove 15 defined in the second, opposite, surface 4*b* correspond to the number main channels 5 defined in the first surface 4*a* of the pallet 3; therefore in this example four grooves 15 are defined in the second, opposite, surface 4*b*. Each groove 15 is aligned with a respective main channel 5. Each groove 15 extends along a length (L7) which is equal to the length (L8—see FIG. 1*e*) of main channel which extends between the first junction 7 and second junction 9. It can be seen that the pallet 3 further comprises a notch 128 which is used for alignment; in particular the notch 128 is used for aligning the microfluidic device 1 into a predefined position in an assembly (such as the assemblies which will be described later).

Figure 1D:
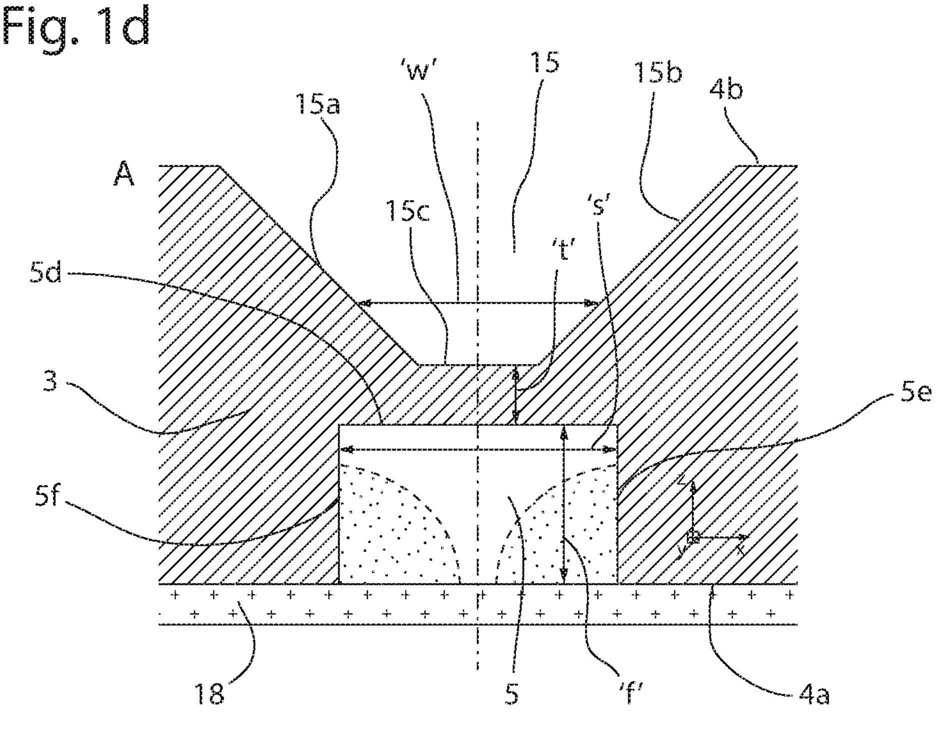
FIG. 1*d* provides a cross sectional view of a part of the microfluidic device taken along line 'A' of FIG. 1*b;*

FIG. 1*d* provides a cross sectional view, of the microfluidic taken along line 'A' of FIG. 1*b*. FIG. 1*d* includes a cross sectional view of a groove 15; it will be understood the all of the grooves 15 will have a configuration similar to that shown in FIG. 1*d*. It can be seen in FIG. 1*d* the main channel 5 which is defined in the first surface 4*a* has a rectangular cross section having a width 's' and depth 'f'. The ratio between the width 's' and depth 'f' of the main channel 5 is preferably between 0.2 and 5; in this particular example the ratio between the width 's' and depth 'f' of the main channel 5 is 1.75. The main channel has a channel bed 5*d* which is planar, and opposing side surfaces 5*e*,5*f* which are perpendicular to the channel bed 5*d* so as to define the rectangular cross section.

The groove 15 is shown to be aligned with the main channel 5; in other words the centre of the groove 15 is aligned with the centre of main channel 5 as represented by axis 16. The width 'w' of the groove 15 tapers. Specifically, side walls 15*a*,15*b* defining the groove 15 are slanted so that width 'w' of the groove 15 tapers towards a surface 15*c* which defines a base of the groove 15. The thickness 't' of the pallet 3 between the groove 15 and channel 5 is never below 0.01 mm, and is preferably 0.15 mm (or at least between 0.01-10 mm); more specifically along the axis 16 (on which the centre of the groove 15 and centre of main channel 5 lie) the thickness 't' of the pallet 3 is between 0.01-10 mm, and is preferably 0.15 mm.

In this example shown in FIG. 1*d*, the surface 15*c* which defines a base of the groove 15 is flat, however in an another embodiment the surface which defines a base of the groove 15 is curved, and preferably has a radius of curvature between 0.05 mm-0.5 mm; and most preferably has a radius of curvature of between 0.2 mm. In yet another embodiment the groove 15 has a v-shaped cross section.

As shown in FIG. 1*b* the microfluidic device 1 further comprises a plurality of buffer source reservoirs 106, sample source reservoir 105, buffer drain reservoirs 107 and sample drain reservoirs 108. The number of buffer source reservoirs 106 correspond to the number main channels 5 defined in the first surface 4*a* of the pallet; therefore in this example four buffer source reservoirs 106 are provided. The number of sample source reservoir 105 correspond to the number main channels 5 defined in the first surface 4*a* of the pallet; therefore in this example four sample source reservoir 105 are provided. The number of buffer drain reservoirs 107 correspond to the number main channels 5 defined in the first surface 4*a* of the pallet; therefore in this example four buffer drain reservoirs 107 are provided. The number of sample drain reservoirs 108 correspond to the number main channels 5 defined in the first surface 4*a* of the pallet; therefore in this example four sample drain reservoirs 108 are provided. Each buffer source reservoir 106 is arranged in fluid communication with a respective main channel 5, and can hold a buffer liquid which is to be fed into the main channel 5. Each sample source reservoir 105 is arranged in fluid communication with a respective pair of inlet subsidiary channels 6*a*,6*b*, and can hold a sample liquid which is to be fed into the inlet subsidiary channels 6*a*,6*b*. Each buffer drain reservoir 107 is arranged in fluid communication with a respective main channel 5, and can receive a buffer liquid which has flown along said main channel 5. Each sample drain reservoir 108 is arranged in fluid communication with a respective pair of outlet subsidiary channels 8*a*,8*b* and can receive a sample liquid which has flown out of the main channel 5 and along an outlet subsidiary channel 8*a*,8*b*.

Briefly referring back to FIG. 1*a*, each main channel 5 is fluidly connected, via a first conduit 11, to a respective buffer source reservoir 106 (shown in FIG. 1*b*). The two inlet subsidiary channels 6*a*,6*b* for each main channel 5, are each fluidly connected, via a common second conduit 12, to a respective sample source reservoir 105 (shown in FIG. 1*b*); both inlet subsidiary channels 6*a*,6*b* being fluidly connected to the same sample source reservoir 105 via the common second conduit 12. In this example the first and second conduits 11,12 each pass through the pallet 3 from the first surface 4*a* to the second, opposite, surface 4*b*.

Each main channel 5 is also fluidly connected, via a third conduit 13, to a respective buffer drain reservoir 107 (shown in FIG. 1*b*). The two outlet subsidiary channels 8*a*,8*b* for each main channel 5, are fluidly connected, via a common fourth conduit 14, to a respective sample drain reservoir 108 (shown in FIG. 1*b*); both outlet subsidiary channels 8*a*,8*b* being fluidly connected to the same sample drain reservoir 108 via the common fourth conduit 14. In this example the third and fourth conduits 13,14 each pass through the pallet 3 from the first surface 4*a* to the second, opposite, surface 4*b*.

Figure 1E:
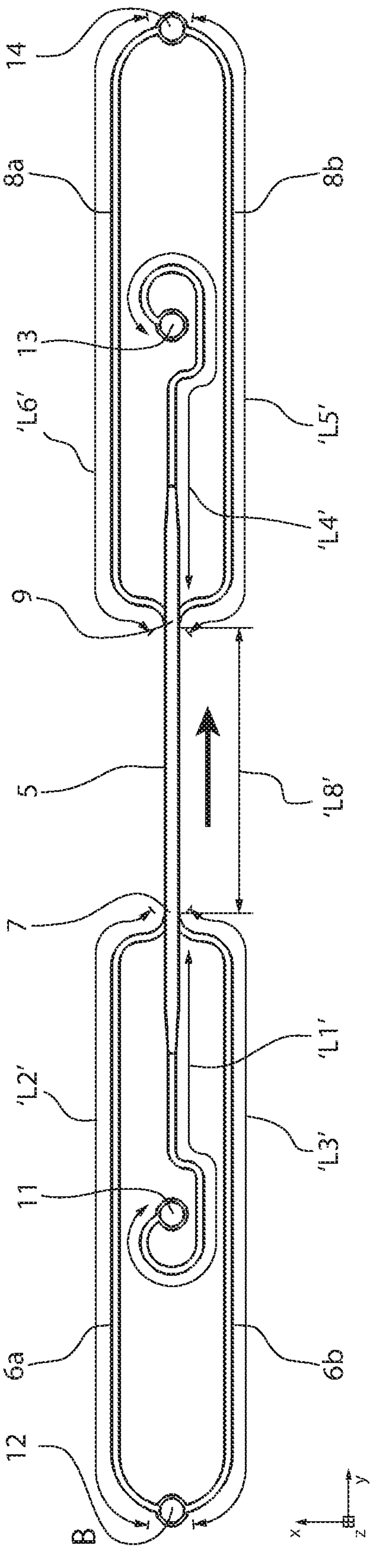
FIG. 1*e* is a plan view of part of the microfluidic device showing one of the main channels and its respective two inlet subsidiary channels and respective two outlet subsidiary channels.

FIG. 1*e* which provides a plan view of one of the main channels 5 and its respective two inlet subsidiary channels 6*a*,6*b* and respective two outlet subsidiary channels 8*a*,8*b*; it will be understood that all of the main channels 5 and their respective two inlet subsidiary channels 6*a*,6*b* and respective two outlet subsidiary channels 8*a*,8*b* will have the same configuration as shown in FIG. 1*d*. Referring to FIG. 1*e* it can be seen that in this embodiment the respective lengths (L2,L3) of each of the two inlet subsidiary channels 6*a*,6*b*, from the second conduit 12 to the first junction 7, is equal to twice the length (L1) of the main channel 5 from the first conduit 11 to the first junction 7 (i.e. 2.L1=L2 and 2.L1=L3). Also the respective lengths (L2,L3) of each of the two inlet subsidiary channels 6*a*,6*b*, from the second conduit 12 to the first junction 7 are equal (i.e. L2=L3). The respective lengths (L5,L6) of each of the two outlet subsidiary channels 8*a*,8*b*, from the fourth conduit 14 to the second junction 9, is equal to twice the length (L4) of the main channel 5 from the third conduit 13 to the second junction 9 (i.e. 2.L4=L5 and 2.L4=L6). Also the respective lengths (L5,L6) of each of the two outlet subsidiary channels 8*a*,8*b*, from the fourth conduit 14 to the second junction 9 are equal (i.e. L5=L6). In this example the lengths 'L2','L3','L5' and 'L6' are equal to each other; however this condition is not essential to the invention. Most preferably the lengths 'L2','L3','L5' and 'L6' will be between 20 and 60 mm, preferably 40 mm. In this example the lengths 'L1' and 'L4' equal to each other; however this condition is not essential to the invention. Most preferably the lengths 'L1' and 'L4' will be between 10 and 40 mm, preferably 20 mm. The length (L8) of the main channel 5 which extends between the first junction 7 and second junction 9 is also illustrated in FIG. 1*e*. Typically the length (L8) of the main channel 5 which extends between the first junction 7 and second junction 9 is between 1 mm-50 mm; in this example the length (L8) of the main channel 5 which extends between the first junction 7 and second junction 9 is 20 mm.

Figure 2A:
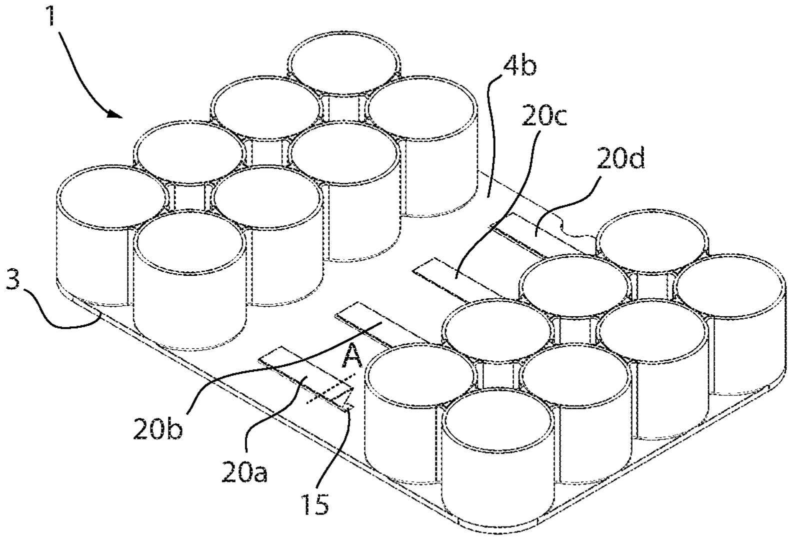
FIG. 2*a* provides a perspective view of an assembly according to a further aspect of the present invention.
Figure 2B:
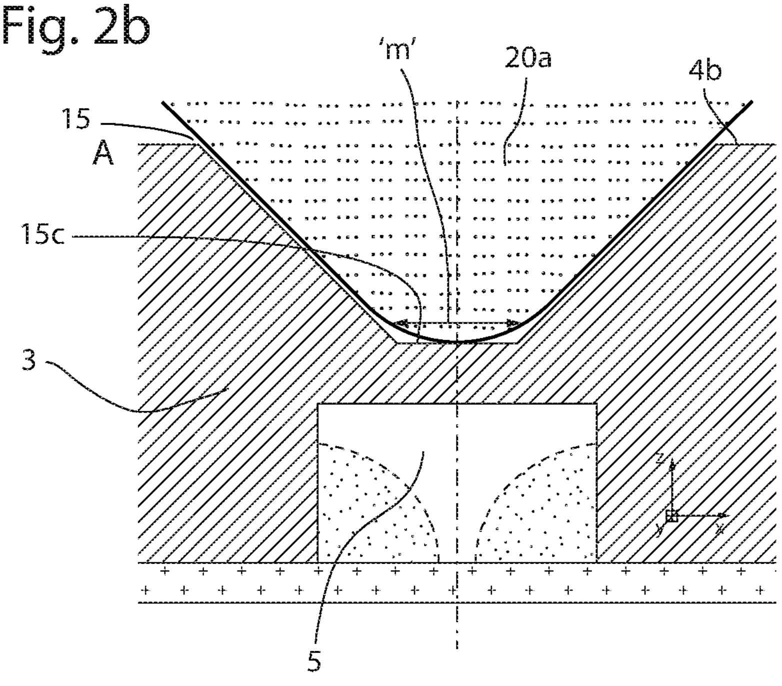
FIG. 2*b* provides a cross-sectional view taken along line 'A' in FIG. 2*a;*

The microfluidic device 1 shown in FIGS. 1*a-e* can be used to form an assembly according to a further aspect of the present invention. FIG. 2*a* provides perspective view of an assembly according to a further aspect of the present invention and FIG. 2*b* provides a cross-sectional view taken along line 'A' in FIG. 2*a*. Referring to FIGS. 2*a* and 2*b*, it can be seen that the assembly comprises a microfluidic device 1 (as shown in FIGS. 1*a-e*) and a means for generating a magnetic field in the form of permanent magnets 20*a-c*. It should be understood that the present invention is not limited to requiring means for generating a magnetic field in the form of permanent magnets, and that any suitable means for generating a magnetic field may be used (e.g. an electromagnet). Importantly the assembly is modular having a microfluidic device 1 which is mechanically independent of the means for generating a magnetic field (permanent magnets 20*a-d*); advantageously the means for generating a magnetic field is not integral to the microfluidic device 1 thus decreasing the manufacturing costs of the microfluidic device 1.

Each of the permanent magnets 20*a-d* is received into a respective groove 15 which is defined in the second surface 4*b* of the pallet 3. The cross section of each permanent magnet 20*a-d* has a shape corresponding to the shape of the cross section of the groove 15; thus in this example each permanent magnet 20*a-d* have a tapered width "m"; and each permanent magnet 20*a-d* also has a flat top surface 21 corresponding to the flat surface 15*c* which defines a base of the groove 15. It will be understood that if the cross section of the grooves 15 had a curved apex (i.e. a base surface 15*c* which has a curved profile), then each permanent magnet 20*a-d* would have a cross section with a correspondingly curved apex (in this case preferably each permanent magnet 20*a-d* would have a cross section would have an apex which has a radius of curvature between 0.05 mm-0.5 mm; and most preferably each permanent magnet 20*a-d* would have a cross section would have an apex which has a radius of curvature of 0.2 mm). Likewise if the grooves has a v-shaped cross section then the permanent magnets 20*a-c* would also be shaped to have a corresponding v-shaped cross section. By having the cross sectional shape of each permanent magnet 20*a-d* corresponding to the cross sectional shape of the grooves 15, allows the permanent magnets 20*a-d* to snugly fit into their respective grooves 15. Preferably the permanent magnets 20*a-d* will snugly fit into their respective grooves 15 so that the apex or top of each of the permanent magnets 20*a-d* abuts the surface 15*c* defining base of the respective groove 5 into which it is received; this ensures that there is no air gap between the permanent magnets 20*a-d* and the surfaces 15*c* defining base of the respective grooves 15.

Furthermore the length of each of the permanent magnets 20*a-d* corresponds to the length of the respective groove 15 into which it is received. Since in this example the length of the grooves 15 corresponds to the length of the main channels 5 between the first junction 7 and second junction 9, the length of each of the permanent magnets 20*a-d* will correspond to the length of the main channels 5 between the first junction 7 and second junction 9.

During use the permanent magnets 20*a-d* can provide a magnetic field within a respective main channel 5. Since each of the permanent magnets 20*a-d* have a length corresponding to the length of the main channels 5 between the first junction 7 and second junction 9, each of the respective permanent magnets 20*a-d* can generate a magnetic field which is constant along the length of a respective main channel between the first junction 7 and second junction 9.

The microfluidic device 1, as shown in FIGS. 1*a-e*, may be used to implement a method, according to a further aspect of the present invention. An embodiment of the method is a method for removing ferromagnetic, paramagnetic (including super-paramagnetic), and/or diamagnetic particles from a sample, as will be described below: A microfluidic device 1, as shown in FIGS. 1*a-e*, is first provided.

The sample which contains ferromagnetic, paramagnetic (including super-paramagnetic), and/or diamagnetic particles is provided in a sample source reservoir 105. The sample flows from the sample source reservoir 105, via the second conduit 12, into the pair of inlet subsidiary channels 6*a*,6*b*. A buffer fluid, such as particle-free water is provided in a buffer source reservoir 106. The buffer fluid flows from the buffer source reservoir 106, via the first conduit 11, into the main channel 5. It will be understood that the buffer fluid may be any fluid which is absent of the particles which are to be removed from the sample (i.e. absent of the ferromagnetic, paramagnetic (including super-paramagnetic), and/or diamagnetic particles which are to be removed); besides particle-free water other liquids such as phosphate buffer saline (PBS) solution or water containing a detergent may be used.

The sample flows along the inlet subsidiary channels 6*a*,6*b* and enters the main channel 5 at the first junction 7. Accordingly at junction 7 the main channel 5 will contain both the sample and buffer fluid so that both the sample and buffer fluid simultaneously flow along the main channel 5.

Figure 3A:
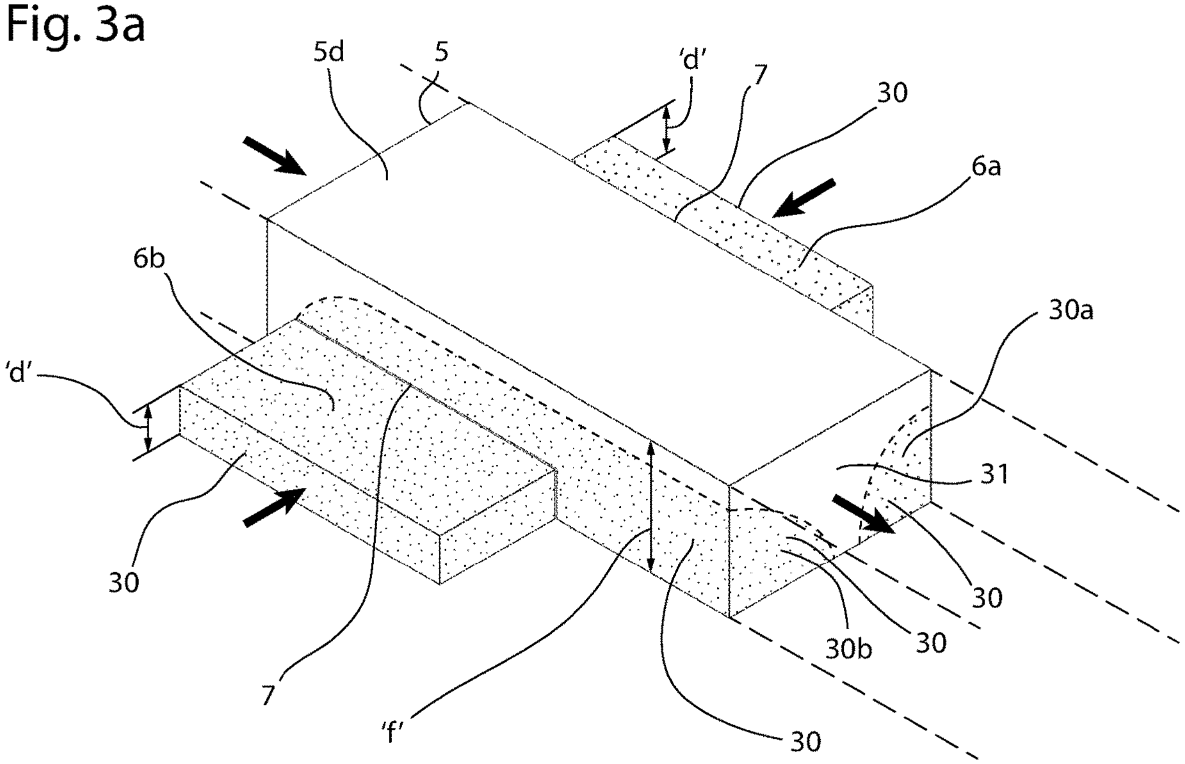
FIG. 3*a* illustrates the arrangement of the sample and buffer fluid in the main channel and two inlet subsidiary channels.
Figure 3B:
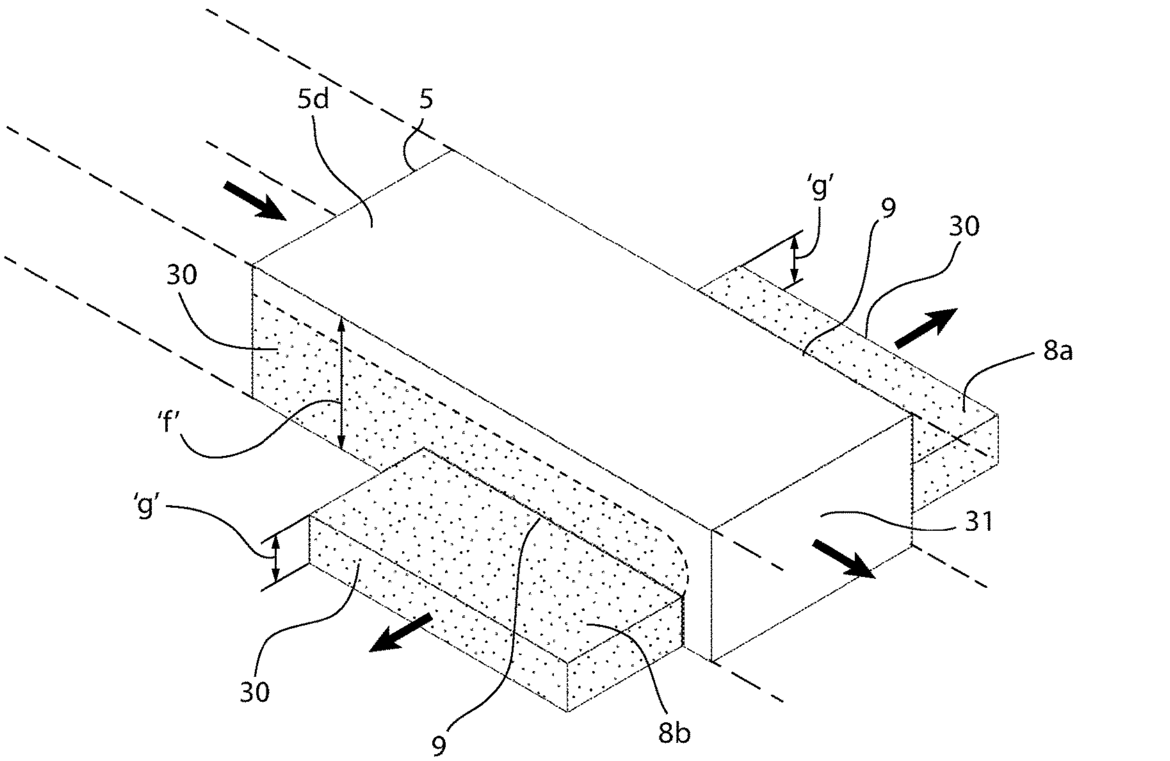
FIG. 3*b* illustrates the arrangement of the sample and buffer fluid in the main channel and two outlet subsidiary channels.

FIGS. 3*a* and 3*b* the arrangement a sample 30 and buffer fluid 31 in the main channel 5 as they flow along the main channel 5. The direction of flow of the sample 30 and buffer fluid 31 along the main channel 5 is indicated by the arrows. Upstream of the first junction 7 the main channel 5 contains only buffer fluid 31 which is coming from the buffer source reservoir 106. However, at junction 7, both of the inlet subsidiary channels 6*a*,6*b* join the main channel 5; at the first junction 7 the sample 30 which is flowing in the respective inlet subsidiary channels 6*a*,6*b* enters the main channel 5 so that both the sample 30 and buffer 31 simultaneously flow along the main channel 5.

As can be seen in FIGS. 3*a*& *b*, two streams 30*a*,30*b* of sample are formed in the main channel 5; a first stream 30*a* of sample is formed by the sample 30 coming from one of the inlet subsidiary channels 6*a*, and a second stream 30*b* of sample is formed by the sample 30 coming from the other one of the inlet subsidiary channels 6*b*. Importantly, as the depth 'd' of each of the two inlet subsidiary channels 6*a*,6*b* is less than the depth 'f' of the main channel 5, the sample 30 and buffer fluid 31 form a particular arrangement within the main channel 5; specifically buffer fluid 31 is interposed between each of the sample streams 30*a*,30*b* and the planar channel bed 5*d* of the main channel 5.

A magnetic field is applied to the sample 30 and buffer 31 which are simultaneously flowing along the main channel 5. The magnetic field moves the ferromagnetic, paramagnetic (or super-paramagnetic), and/or diamagnetic particles contained within the sample 30 in both of the sample streams 30*a*, 30*b* into the buffer 31. In this example in order to apply a magnetic field to the sample 30 (and buffer fluid 31) which is flowing along the main channel 5, a permanent magnet 20*a-d* is moved into the groove 15 on the second surface 4*b* of the pallet 3, which is aligned with said main channel 5 in which the sample 30 and buffer 31 flow. The permanent magnet 20*a-c* has a magnetisation which is in a direction which is perpendicular to the direction of flow of the sample 30 and buffer 31 in the main channel 5, and is also perpendicular to the planar channel bed 5*d* of the main channel (or perpendicular to a tangent to the apex of the cross section of the main channel if the main channel has a curved channel bed or if the main channel 5 has a v-shaped cross section). It will be understood that any means for generating a magnetic field may be used to provide the magnetic field which is applied to the sample 30 and buffer 31; the present invention is not limited to requiring the use of a permanent magnet 20*a-d*. It is pointed out that by providing a permanent magnet 20*a-d* in the groove the assembly shown in FIGS. 2*a*& *b* is formed.

Advantageously, because buffer fluid 31 is interposed between each of the sample 30 and the channel bed 5*d* of the main channel 5, ferromagnetic, paramagnetic (or super-paramagnetic), and/or diamagnetic particles contained within the sample 30 can be moved from the sample 30 into the buffer fluid 31, in a direction which is perpendicular to, or substantially perpendicular to, the direction of flow of the sample streams 30*a*,30*b* and buffer fluid 31 in the main channel 5. More specifically ferromagnetic, paramagnetic (or super paramagnetic), and/or diamagnetic particles contained within the sample 30 can be moved from each of the sample streams 30*a*,30*b*, into the buffer fluid 31, in a direction which is towards the channel bed 5*d* of the main channel 5 (or in a direction which perpendicular to the channel bed 5*d* of the main channel 5; or perpendicular to a tangent to the apex of the cross section of the main channel if the main channel has a curved channel bed or if the main channel 5 has a v-shaped cross section).

Furthermore, as is shown in FIGS. 3*a*& *b*, buffer fluid 31 is interposed between the sample streams 30*a*, 30*b*; thus ferromagnetic, paramagnetic (or super paramagnetic), and/or diamagnetic particles contained within the sample 30 can also be moved from each of the sample streams 30*a*,30*b*, into the buffer fluid 31, in a direction which is perpendicular to, or substantially perpendicular to, the direction of flow of the sample streams 30*a*,30*b*, and buffer fluid 31 in the main channel 5. More specifically ferromagnetic, paramagnetic (or super paramagnetic), and/or diamagnetic particles contained within the sample 30 can be moved from each of the sample streams 30*a*,30*b*, into the buffer fluid 31, in a direction which is parallel to the channel bed 5*d* of the main channel 5 (or in a direction which is parallel to a tangent to the apex of the cross section of the main channel if the main channel has a curved channel bed or a v-shaped cross section).

By the time the sample 30 and buffer fluid 31 have reached the second junction 9, all of (or substantially all of) the ferromagnetic, paramagnetic (or super paramagnetic), and/or diamagnetic particles contained within the sample 30 will have been moved out of the sample 30 in both sample streams 30*a*,30*b* and into the buffer fluid 31 by the magnetic field.

Due to the arrangement of the sample 30 and buffer fluid 31 within the main channel 5, and since the depth 'g' of the two outlet subsidiary channels 8*a*,8*b* correspond to the depth 'd' of the two inlet subsidiary channels 6*a*,6*b* the sample fluid 30, which is now absent of any ferromagnetic (or super paramagnetic), paramagnetic, and/or diamagnetic particles, will flow into the respective outlet subsidiary channels 8*a*,8*b* at the second junction 9. More specifically, the first stream 30*a* of sample fluid 30 is received into the outlet subsidiary channel 8*a* and the second stream 30*b* of sample fluid 30 is received into the other outlet subsidiary channel 8*a*. From the outlet subsidiary channels 8*a*,8*b* the sample will flow, via the fourth conduit 14, into the sample drain reservoir 108 where it is collected.

At the second junction 9 the buffer fluid will however contain all the ferromagnetic, paramagnetic (or super paramagnetic), and/or diamagnetic particles which have been removed from the sample 30. Due to the arrangement of the sample 30 and buffer fluid 31 within the main channel 5, and since the depth 'g' of the two outlet subsidiary channels 8*a*,8*b* is less than the depth of the main channel 5, the buffer fluid containing the ferromagnetic, paramagnetic (or super paramagnetic), and/or diamagnetic particles will remain in the main channel 5 (will not flow into either of the outlet subsidiary channels 8*a*,8*b*) and will flow, via the third conduit 13, into the buffer drain reservoir 107.

In the above example, in the main channel 5 the flow rate of the sample 30 flowing along the main channel 5 is equal to the flow rate of the buffer fluid 31 flowing along the main channel 5; the ratio between flow rate of sample 30 in the inlet subsidiary channels 6*a*,6*b* and buffer sample 31 in main channel 5 at the first junction 7 is 0.1-10 and is preferably 0.5-2; and the ratio between flow rates of sample in the outlet subsidiary channels 8*a*,8*b* and buffer in main channel at the second junction is 0.1-10 and is preferably 0.5-2.

Figure 4A:
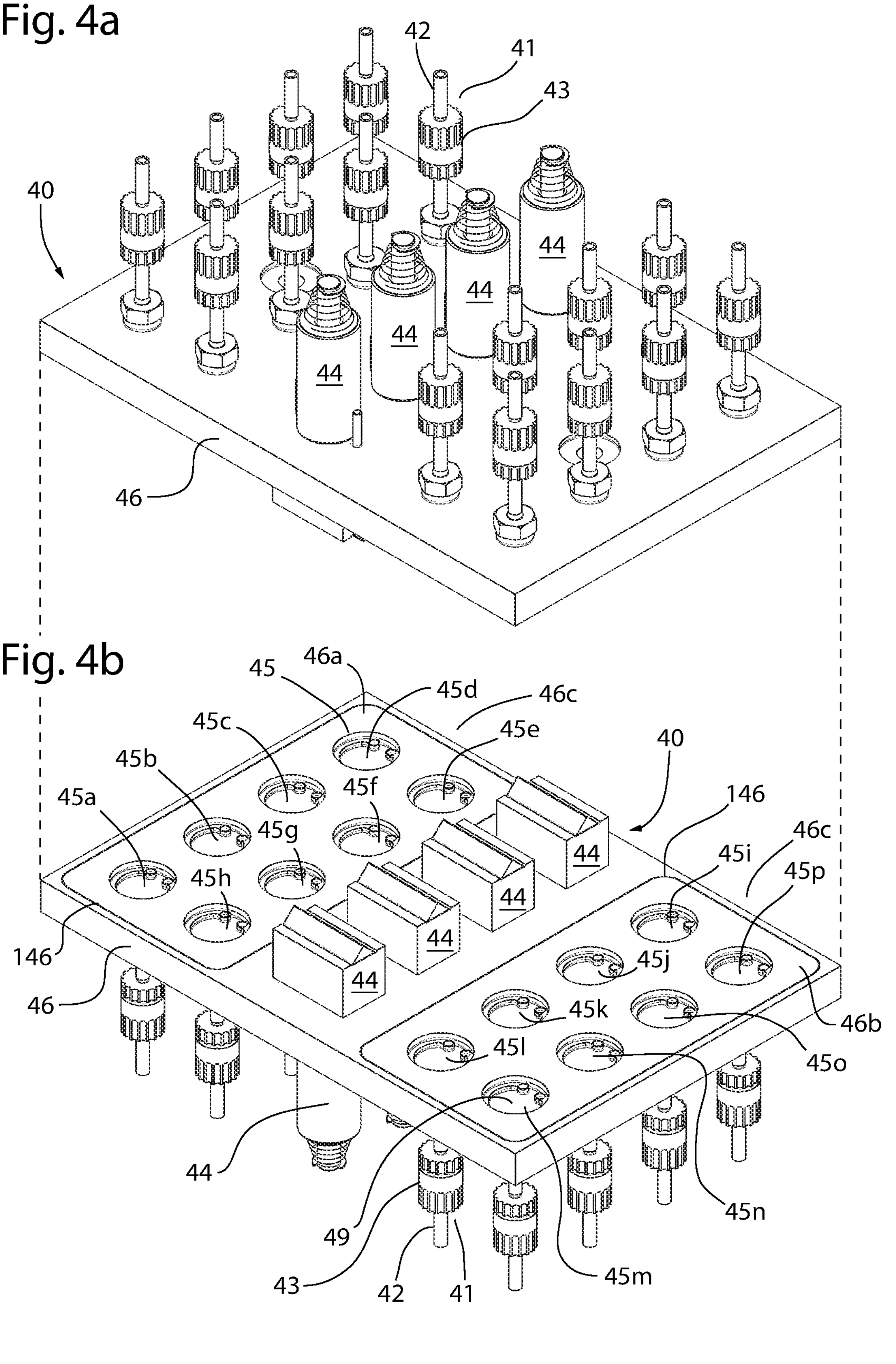

FIGS. 4*a* and 4*b* provide perspective views of an interface component 40 according to a further aspect of the present invention. FIG. 4*a* provides a perspective view of a top of the interface component 40 and FIG. 4*b* provides a perspective view of a bottom of the interface component 40. The interface component 40 is suitable for cooperating with the microfluidic device 1 shown in FIGS. 1*a* and *b*. When the interface component 40 is placed in cooperating with the microfluidic device 1 an assembly according to a further aspect of the present invention is formed.

Referring to FIGS. 4*a* and 4*b*, the interface component 40 further comprises a plurality of magnetic assemblies 44. In this example the interface component 40 comprises four magnetic assemblies 44, however it will be understood that the interface component 40 may comprises any number of magnetic assemblies 44.

The interface component 40 further comprises a plurality of elements 41, each of which can be selectively connected to a pneumatic system which can provide a fluid (such a pressurized air) to the elements 41. In this example the interface component 40 comprises sixteen elements 41, however it will be understood that the interface component 40 may comprise any number of elements 41; preferably the interface component 40 comprises at least four elements 41.

Each element 41 comprises an input port 42 which can be selectively fluidly connected to a pneumatic system; a flow restrictor 43, which is fluidly connected to the input port 42, wherein the flow restrictor 43 is configured to restrict the flow of fluid through the element 41; and an aerosol filter 49 which is arranged to be in fluid communication with the adjustable flow restrictor 43. In this example the aerosol filter 49 is defined by a layer 49 of hydrophobic material; the layer 49 comprising pores having a size 0.22 μm (or at least in the range 0.1-0.3 μm).

The interface component 40 further comprises a platform 46 which supports each of the magnetic assemblies 44 and elements 41. In this example the platform 46 is modular composed of two flat-gaskets 46*a*,46*b* and main member 46*c*; each of the two flat-gaskets 46*a*,46*b* are received into a respective cut-out 146 which is defined in the main member 46*c*.

The interface component 40 further comprises a plurality of outlets 45*a-p*, each of the outlets 45*a-p* is in fluid communication with a respective element 41, so that fluid can flow from the element 41, out of the interface component, via the outlets 45*a-p*. In the example illustrated in FIGS. 4*a* and 4*b*, the outlets 45*a-p* are defined by apertures 45*a-p* which are defined in the platform 46. A layer 49 of hydrophobic material which defines the aerosol filter 49 of a respective element 41, overlays a respective apertures 45*a-p* which defines an outlet 45*a-p*.

The number of outlets 45*a-p* should preferably correspond to the number of elements 41; accordingly in this example the interface component 40 comprises sixteen outlets 41. However it will be understood that the interface component 40 may be provided with any number of outlets 45*a-p*; preferably the interface component 40 comprises at least four outlets 45*a-p*. Each of the outlets 45*a-p* can be selectively arranged to be in fluid communication with a respective sample source reservoir 105, buffer source reservoir 106, buffer drain reservoir 107, or sample drain reservoir 108, of the microfluidic device 1.

Figure 5A:
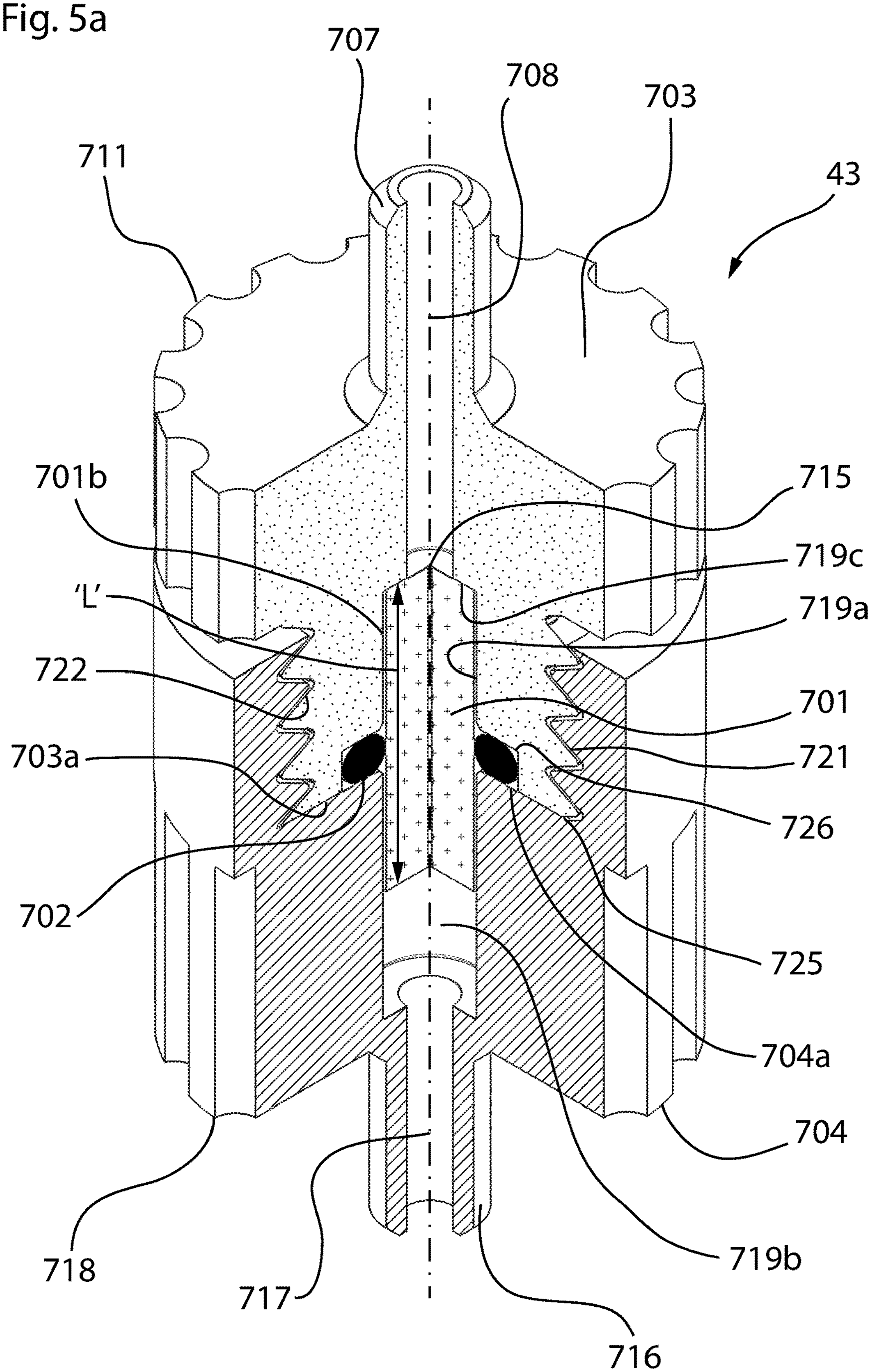
FIG. 5*a* provides a perspective, part cross-sectional, view of a flow restrictor of an element of the interface component shown in FIGS. 4*a* and 4*b;*
Figure 5B:
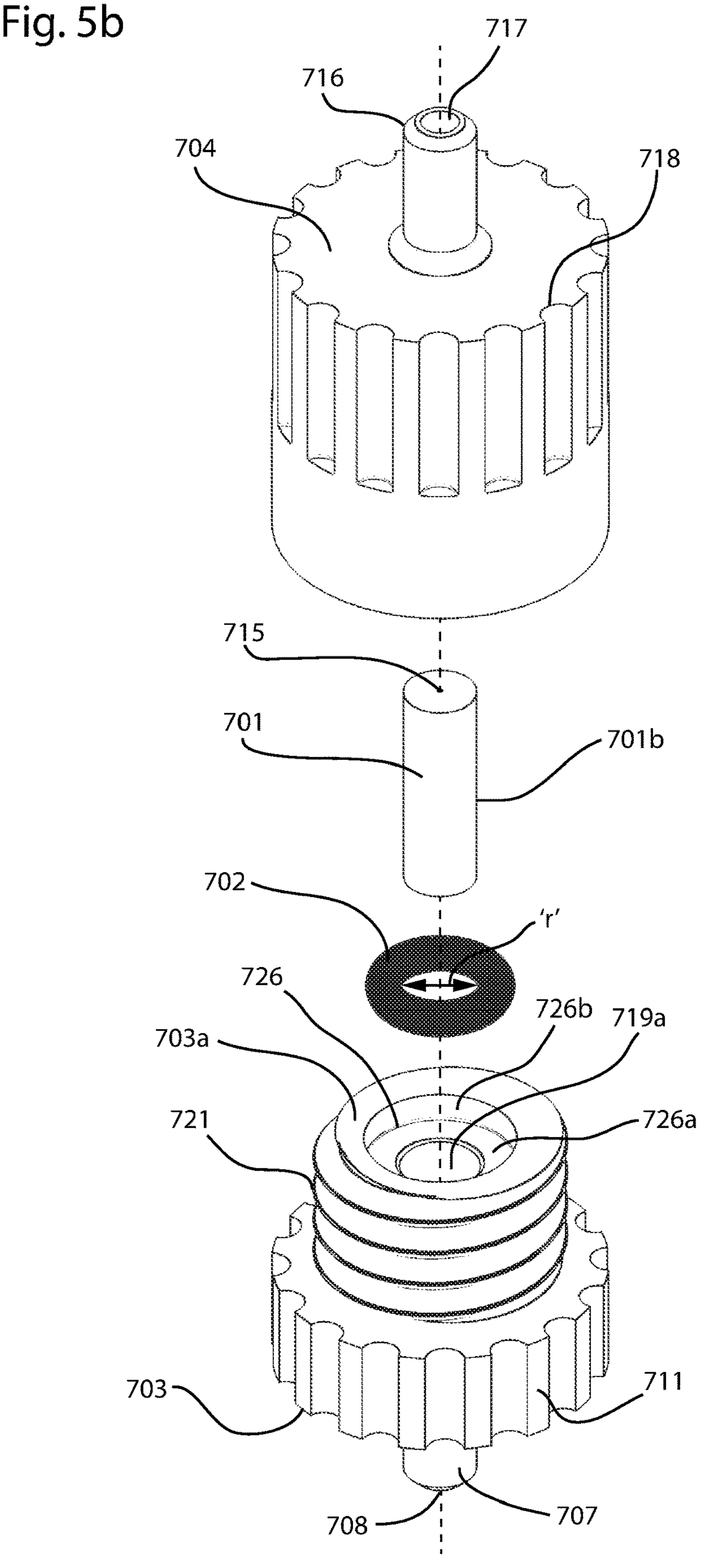
FIG. 5*b* provides an exploded view of the flow restrictor of an element of the interface component shown in FIGS. 4*a* and 4*b;*

FIG. 5*a* provides a perspective, part cross-sectional, view of a flow restrictor 43 of an element 41. FIG. 5*b* provides an exploded view of the flow restrictor 43. It will be understood that each of the flows restrictors 43 in the interface component 40 will have a similar configuration to the flow restrictor 43 illustrated in FIGS. 5*a* and *b*.

Referring to FIGS. 5*a* and 5*b*, the flow restrictor 43 comprises, an inlet member 707 which has an inlet channel 708 defined therein; and an outlet member 716 which has an outlet channel 717 defined therein. The inlet channel 708 and outlet channel 717 are fluidly connected. Each of the inlet and outlet channels 708, 717 each have a circular cross section. The inlet and outlet channels 708, 717 each have a diameter in the range 0.2 mm-1.5 mm.

A capillary member 701, which comprises an intermediate channel 715, is interposed between the inlet channel 708 and outlet channel 717. The intermediate channel 715 has dimensions smaller than the dimensions of the inlet and outlet channels 708,717; specifically the diameter of the intermediate channel 715 is less than the diameters of each of inlet and outlet channels 708,717. Preferably the intermediate channel has a circular cross section that has a diameter which is between 1-100 μm. In this example the capillary member 701 is composed of glass; however it will be understood that capillary member 701 may be composed of any suitable material e.g. polymer.

The flow restrictor 43 comprises a male member 703 and female member 704. The male member 703 comprises the inlet member 707, and the female member 704 comprises the outlet member 716.

The male member 703 and female member 704 are configured so that they can mechanically cooperate with each other so that the male and female members can be fixed together. In this example the male member 703 has an external tread 721, and the female has a corresponding internal thread 722, which allow the members 703,704 to be fixed together. The male member 703 further comprises ribbing 711 defined an outer surface thereof, and the female member 704 further comprises ribbing 718 on an outer surface thereof; the ribbings 711,718 facilitate gripping of the members 703,704 as the members 703,704 are rotated with respect to one another so that their respective threads 721,722 can engage one another.

When the male member 703 and female member 704 are mechanically cooperated, an end extremity 703*a* of the male member 703 will abut the female member 704 at an interface 725.

At its end extremity 703*a* the male member 703 comprises an annular groove 726 defined by perpendicular surfaces 726*a*,726*b*. An o-ring 702 abuts both surfaces 726*a*,726*b*. The o-ring also abuts surface 704*a* which defines a base of the female member 704. The capillary member 701 passes through the o-ring 702; the diameter of the o-ring is substantially equal to the diameter of the capillary member 701 so that the o-ring also abuts an outer surface 701*b* of the capillary member 701. In the present embodiment the ratio of the cord thickness of the o-ring 702 to the inner diameter 'r' of the o-ring is 0.5 (or 0.8 for example); however the ratio of the cord thickness of the o-ring to the inner diameter may be any value between 0.5-1.

In a variation of the embodiment the annular groove 726 may be defined in the female member and the o-ring 702 will be arranged to abut the surfaces which define the annular groove in the female member; for example the surface 704*a* the surface 704*a* which defines the base of the female member 704 may comprise an annular groove defined therein, and the o-ring 702 abuts surfaces which define the annular groove.

The male member 703 has a pocket 719*a* defined therein; and the female member 704 has a pocket 719*b* defined therein. The pockets 719*a,b* can each receive a portion of the capillary member 701, so that a portion of length of the capillary member 701 is contained within the pocket 719*a* of the male member 703, and another a portion of length of the capillary member 701 is contained within pocket 719*b* of the female member 704.

The depth of the pocket 719*a* in the male member 703 is such that when the capillary member 701 is positioned into the pocket 719*a*, such that capillary member 701 abuts a base 719*c* of the pocket 19*a*, at least 0.5 mm of the length of the capillary member 701 extends out of the pocket 19*a* of the male member 703. In the example illustrated in FIG. 5, the capillary member 701 has a length 'L' of 2 mm; however it will be understood that the capillary member 701 may have any length greater than, or equal to, 0.5 mm. Since at least 0.5 mm of the length of the capillary member 701 should extend out of the pocket 19*a* of the male member 703, the pocket 719*a* defined in the male member 703 has a depth of 1.5 mm. However it will be understood that the pocket 719*a* defined in the male member 703 may have a depth between 1 mm-20 mm. The depth of the pocket 719*b* defined in female member 704 should be as large as possible so as to allow for the accommodation of capillary members 701 have different lengths; preferably the depth of the pocket 719*b* defined in female member 704 is between 1-20 mm; example illustrated in FIG. 5, the depth of the pocket 719*b* defined in female member 704 is 5 mm.

In an further aspect of the present invention, an assembly comprising a interface component 40 and a plurality of capillary members 701 each of which comprises an intermediate channel 715, but the length 'L' of the capillary members 701 differ between each of the plurality of capillary members 701 so that the each have intermediate channels 715 of different lengths. In a preferred embodiment the diameter of the intermediate channels 715 of the plurality of capillary members 701 are equal. The plurality of capillary members 701 of different length 'L' can be used to achieve different levels of restriction to the flow through an element 41 of the interface component 40. A user can select from the plurality of capillary members 701 a capillary member 701 which has a length 'L' which will provide the appropriate resistance to flow; for example in order to increase the restriction to flow through an element 41, the user can replace the capillary member 701 in said element 41 with a capillary member 701 which has a longer length 'L'; likewise in order to decrease the restriction to flow through an element 41, the user can replace the capillary member 701 in said element 41 with a shorter capillary member 701. Importantly, the depth of the pocket 719*a* provided in the male member 703 plus the depth of the pocket 719*b* which is provided in the female member 704 must be equal to, or greater than, the length of the longest capillary member 701 in the plurality of capillary members 701.

Figure 6C:
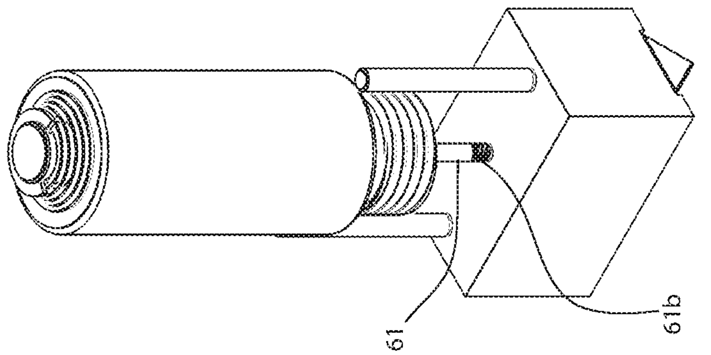
FIG. 6*c* provides a perspective view the magnetic assembly of the interface component shown in FIGS. 4*a* and 4*b;*
Figure 6B:
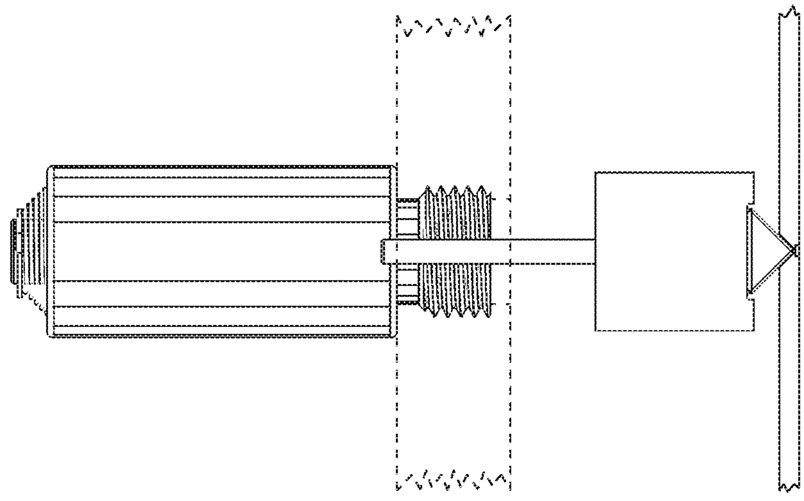
FIGS. 6*a* and 6*b* each provide a cross sectional view of a magnetic assembly of the interface component shown in FIGS. 4*a* and 4*b;*
Figure 6A:
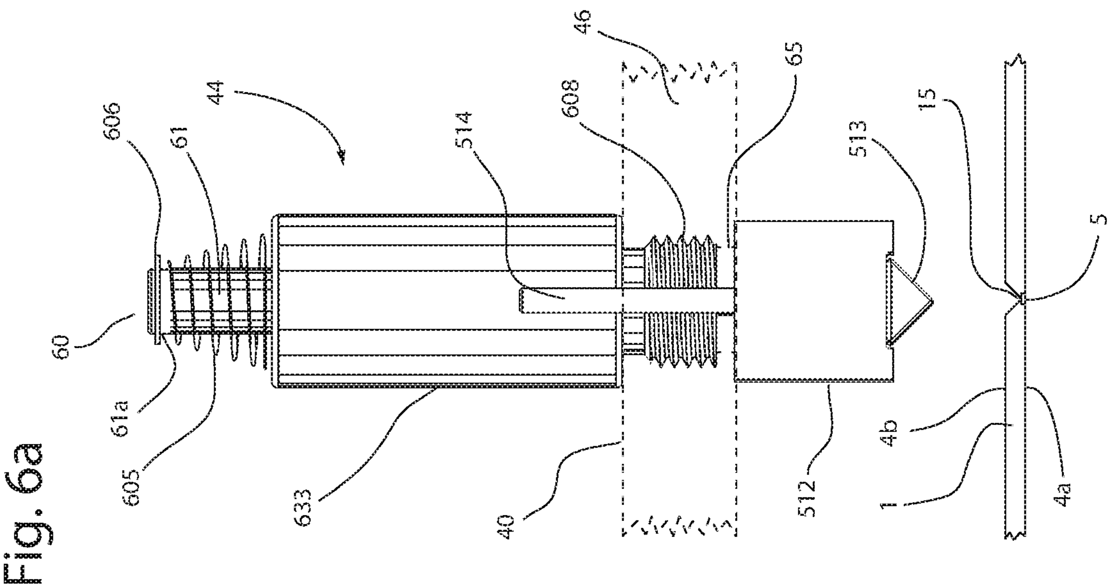

FIGS. 6*a* and 6*b* each provide a cross sectional view of a magnetic assembly 44. FIG. 6*c* provides a perspective view the magnetic assembly 44. It will be understood that each of the magnetic assembly 44 of the interface component 40 will have a similar configuration to the magnetic assembly 44 illustrated in FIGS. 6*a-c*.

Referring to FIGS. 6*a-c* it is shown that the magnetic assembly 44, comprises, a plunger 60. The plunger 60 comprises a housing 633 which has a threaded portion 608 which is received into a through-hole 65 defined in the platform 46 so as to secure the magnetic assembly 44 to the platform 46 of the interface component 40. The surface of the through-hole 65 is also threaded and the threads provided on the threaded portion 608 cooperate with the threads provided on the surface of the through-hole 65.

One end of the plunger 60 is connected to a means for generating a magnetic field 513. In this example means for generating a magnetic field 513 is a permanent magnet 513. It will be understood that any suitable means for generating a magnetic field may be provided.

The plunger 60 comprises a shaft 61 which has a cap member 606 at a first end 61*a* thereof, and a support member 512 (only one pin shown in FIGS. 6*a*, 6*b*) at a second, opposite, end 61*b* thereof. In this example the shaft 61 is treaded at the second end 61*b* and the second end 61*b* is received into a corresponding treaded hole which is defined in the support member 512. The threaded portion 608 of the housing 633 is tubular shaped and the shaft 61 extends through the volume defined within the tubular shaped threaded portion 608. The permanent magnet 513 is mechanically supported on the support member 512. The support member 512 further comprises two parallel guide pins 514. The two parallel guide pins 514 extend through respective guide-through-holes which are defined in the platform 46. The two parallel pins 514 help to prevent the permanent magnet 513 from rotating around the longitudinal axis of the shaft 61.

The plunger 60 further comprises an electromagnet 603 which is housed within a housing 603. The plunger 60 comprises a biasing means in the form of a spring 605 which biases the shaft 61 towards a first position; the spring 605 is interposed between the cap member 606 on the shaft 61 and housing 603. The electromagnet 603 cooperates with the shaft 61 such that operating the electromagnet 603 forces the shaft 61 to move, against the biasing force of the spring 605, towards a second position. FIG. 6*a* shows the shaft 61 having been moved by the biasing force of the spring 605, to its first position. FIG. 6*b* shows the shaft 61 having been moved by the electromagnet 603, against the biasing force of the spring 605, to its second position. When the shaft 61 is moved towards its first position the permanent magnet 513 is moved in a direction which is towards the platform 46; when the shaft 61 is moved towards its second position the permanent magnet 513 is moved in a direction which is away from the platform 46.

FIGS. 6*a* and 6*b* also illustrate a cross section of a microfluidic device 1; showing a cross section of the groove 15 and a cross section of the main channel 5. As shown in FIG. 6*a*, the electromagnet 603 is deactivated so that the shaft 61 is moved towards its first position and the permanent magnet 513 is moved in a direction which is towards the platform 46. When the shaft 61 is in its first position the interface component 40 is positioned so that the permanent magnet 513 of the magnetic assembly 44 is aligned over the groove 15 which is defined in the second surface 4*b* of the microfluidic device 1. The electromagnet 603 is then operated so that it move the shaft 61 against the biasing force of the spring 605, to its second position and the permanent magnet 513 is moved in a direction away from the platform 46. When the shaft 61 is in its second position the permanent magnet 513 is received into the groove 15 of the microfluidic device 1. Once received into the groove 15 the permanent magnet 513 can provide a magnetization in the region of the main channel 5 which will move ferromagnetic, paramagnetic (including super-paramagnetic), and/or diamagnetic particles from a sample into a buffer fluid which are simultaneously flowing along the main channel 5.

The permanent magnet 513 has a shape which corresponds to the shape of the groove 15 in the microfluidic device 1. Specifically permanent magnet 513 has a cross sectional shape which corresponds to the cross sectional shape of the groove 15 in the microfluidic device 1. In the example shown in FIGS. 6*a* and 6*b* the groove 15 is v-shaped, accordingly the permanent magnet 513 has a triangular-shaped cross-section having dimension which allow at least the peak of the triangular-shaped cross-sectioned permanent magnet 513 to be received into the groove 15. The permanent magnet 513 also extends over the whole length of the groove 15; and the v-shaped cross sectional profile is constant along the whole length of permanent magnet 513.

It will be understood that the permanent magnet 513 may have any suitable shape. Preferably the shape of permanent magnet 513 will correspond to the shape of the groove 15 defined in the microfluidic device 1 which is to be used with the interface component, so that the permanent magnet 513 can fit snugly into the groove 15 of the microfluidic device 1. In the above-mentioned example permanent magnet 513 had a triangular cross section, thus making it ideally suitable for use with microfluidic devices that have groove 15 which have a v-shaped cross section. It will be understood that the permanent magnet 513 may be configured to have a cross section which has a curved tip (instead of pointed tip in the case of a triangular cross section); interface components with permanent magnet 513 that have curved tip are ideally suited for use with microfluidic devices 1 that have grooves 15 that have a curved cross section; preferably the radius of curvature of the curved tip of the permanent magnet 513 is equal to the radius of curvature of the curved groove 15 in the microfluidic device 1. In an exemplary embodiment the permanent magnet 513 may have a curved tip which has a radius of curvature between 0.05 mm-0.5 mm; and most preferably has a radius of curvature of between 0.2 mm. In another embodiment the permanent magnet 513 may be configured to have cross section which has a flat tip; interface components with permanent magnet 513 that have flat tip are ideally suited for use with microfluidic devices 1 that have grooves 15 with a planar base.

Figure 7:
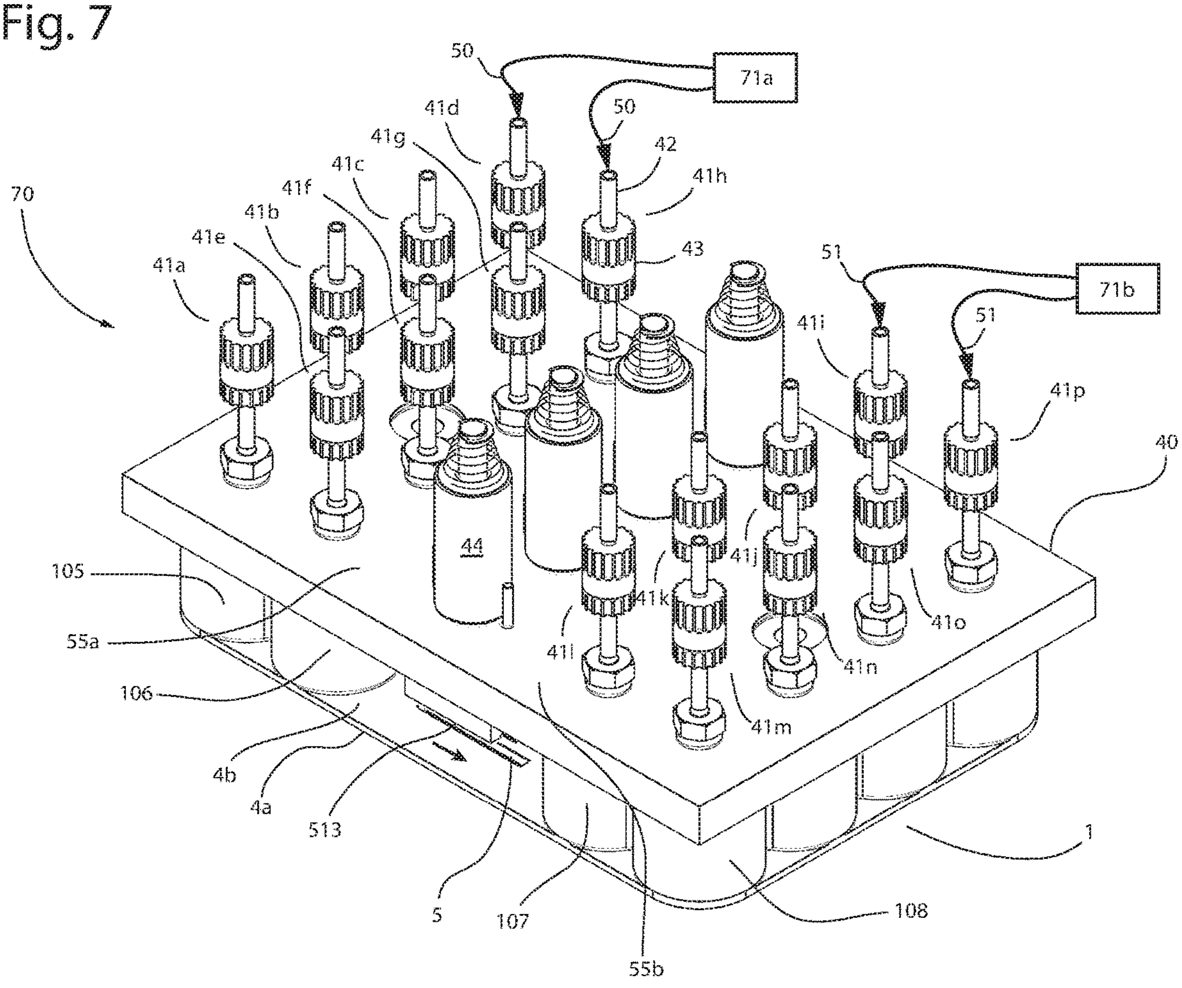
FIG. 7 provides a perspective view of an assembly according to a further aspect of the present invention.

FIG. 7 provides a perspective view of an assembly 70 according to a further aspect of the present invention. The assembly 70 comprises a microfluidic device 1 shown FIGS. 1*a* and *b*, and interface component 40 shown in FIGS. 4*a* and 4*b*. Importantly the assembly 70 is modular having a microfluidic device 1 which is mechanically independent of the interface component 40 (which comprises the permanent magnets 513); advantageously the interface component 40 can be selectively arranged to mechanically cooperate with the microfluidic device 1; however the permanent magnets 513 are not integral to the microfluidic device 1 thus decreasing the manufacturing costs of the microfluidic device 1.

In the assembly 7 shown in FIG. 7, the interface component 40 is arranged to mechanically cooperate with the microfluidic device 1 so that each of the outlets 45*a-p* of the interface component 40 is in fluid communication with a respective sample source reservoir 105, buffer source reservoir 106, buffer drain reservoir 107, or sample drain reservoir 108, of the microfluidic device 1. In this example shown in FIG. 7 outlets 45*a-d* will overlay a respective sample source reservoir 105 of the microfluidic device 1 so that the outlets 45*a-d* are in fluid communication with a respective sample source reservoir 105; outlets 45*e-h* will overlay a respective buffer source reservoir 106 of the microfluidic device 1 so that the outlets 45*e-h* are in fluid communication with a respective buffer source reservoir 106; outlets 45*i*-L will overlay a respective buffer drain reservoir 107 of the microfluidic device 1 so that the outlets 45*i-l* are in fluid communication with a respective buffer drain reservoir 107; outlets 45*m-p* will overlay a respective sample drain reservoir 108 of the microfluidic device 1 so that the outlets 45*i*-L are in fluid communication with a respective sample drain reservoir 108. The dimensions of the cross section of each of the outlets 45*a-p* correspond to the cross sectional dimensions of the respective buffer source reservoirs 106, sample source reservoir 105, buffer drain reservoirs 107 and sample drain reservoirs 108, such that an impermeable seal is formed between the respective reservoir and outlet 45*a-p* when in mechanical cooperation. It is also noted that the relative positions of the outlets 45*a-p* correspond to the relative positions of the reservoirs.

The interface component 40 comprises a row of four magnetic assemblies 44 each identical to the magnetic assembly illustrated in FIGS. 6*a*, 6*b*. The elements 41*a-h* which are located on a first side 55*a* of the row of four magnetic assemblies 44 are all fluidly connected to a pneumatic system 71*a* which provides positive air flow (indicated by the arrow 50). The positive air flow which is provided to the elements 41*a-d* passes through the respective elements 41*a-d* and into the respective sample source reservoirs 105 via the respective outlets 45*a-d*. The positive air flow pushes sample which is in the respective sample source reservoirs 105 to flow, via respective second conduits 12, into respective pairs of inlet subsidiary channels 6*a*,6*b*; along the respective pairs of inlet subsidiary channels 6*a*,6*b*; and subsequently pushes the sample to flow into respective main channels 5 of the microfluidic device 1.

The elements 41*e-h* which are also located on the first side 55*a* of the row of four magnetic assemblies 44 are all also fluidly connected to a pneumatic system 71*a* which provides positive air flow (indicated by the arrow 50). The positive air flow which is provided to the elements e-h passes through the respective elements 41*e-h* and into the respective buffer source reservoirs 106 via the respective outlets 45*e-h*; the positive air flow pushes buffer fluid which is in the respective buffer source reservoirs 106 to flow, via respective first conduits 11, into respective main channels 5 of the microfluidic device 1.

The elements 41*i-l* which are located on a second, opposite, side 55*b* of the row of four magnetic assemblies 44 are all fluidly connected to a pneumatic system 71*b* which provides negative air flow (indicated by the arrow 51). The negative air flow which is provided to the elements 41*i-l* passes through the respective elements 41*i-l* and into the respective sample source reservoirs 105 via the respective outlets 45*i-l*; the positive air flow sucks the buffer fluid, which contains ferromagnetic, paramagnetic (including super-paramagnetic), and/or diamagnetic particles which were removed from the sample, from the main channel 5 into respective buffer drain reservoirs 107, via the third conduit 13.

The elements 41*m-p* which are also located on the second, opposite, side 55*b* of the row of four magnetic assemblies 44, are also all fluidly connected to a pneumatic system 71*b* which provides negative air flow (indicated by the arrow 51). The negative air flow which is provided to the elements 41*m-p* passes through the respective elements 41*m-p* and into the respective sample drain reservoirs 108 via the respective outlets 45*m-p*; the positive air flow sucks the sample fluid, which is absent of ferromagnetic, paramagnetic (including super-paramagnetic), and/or diamagnetic particles, from the main channel 5 into respective pairs of outlet subsidiary channels 8*a*,8*b*; along the respective pairs of outlet subsidiary channels 8*a*,8*b*; and subsequently into respective sample drain reservoirs 108, via the fourth conduit 14.

The assembly 70 can be used to perform a method according to a further embodiment of the present invention. The assembly 70 is provided. A sample containing ferromagnetic, paramagnetic (including super-paramagnetic), and/or diamagnetic particles, is provided in at least one of the sample source reservoirs 105; in this example the sample is provided in all of the sample source reservoirs 105 in the microfluidic device (in this example microfluidic device 1 comprises four sample source reservoirs 105). A buffer fluid is provided in at least one of the buffer source reservoirs 106; in this example sample is provided in all of the buffer source reservoirs 106 in the microfluidic device (in this example microfluidic device 1 comprises four buffer source reservoirs 106). In this example there are also a corresponding number of buffer drain reservoirs 107 and source drain reservoirs 108 i.e. four buffer drain reservoirs 107, and four source drain reservoirs 108.

Once the respective sample source reservoirs 105 and buffer source reservoirs 106 have been filled, the interface component 40 is then arranged to mechanically cooperate with the microfluidic device 1. Specifically the interface component 40 is arranged so that: the outlets 45*a-d* overlay a respective sample source reservoir 105 of the microfluidic device 1 so that the outlets 45*a-d* are in fluid communication with a respective sample source reservoir 105; the outlets 45*e-h* overlay a respective buffer source reservoir 106 of the microfluidic device 1 so that the outlets 45*e-h* are in fluid communication with a respective buffer source reservoir 106; the outlets 45*i-l* overlay a respective buffer drain reservoir 107 of the microfluidic device 1 so that the outlets 45*i-l* are in fluid communication with a respective buffer drain reservoir 107; the outlets 45*m-p* overlay a respective sample drain reservoir 108 of the microfluidic device 1 so that the outlets 45*i-l* are in fluid communication with a respective sample drain reservoir 108.

By arranging the interface component 40 to mechanically cooperate with the microfluidic device 1 in the manner mentioned above, the permanent magnet 513 of each magnetic assembly 44 is aligned over a respective groove 15 of the microfluidic device 1. At this stage the electromagnets 603 of each magnetic assembly 44 may be deactivated so that the shaft 61 occupies its first position thus ensuring that the permanent magnet 513 is at a position which is remote from the microfluidic device 1. However once the interface component 40 has been arranged to mechanically cooperate with the microfluidic device 1 the electromagnet 603 of each magnetic assembly 44 is then operated; the electromagnets force each shaft 61 to move, against the biasing force of the spring 605, to its second position, so that the permanent magnet 513 of each magnetic assembly is moved into a respective groove 15 in the microfluidic device 1. Once received into the groove 15 the permanent magnets 513 is configured to provide a magnetization in the region of a respective main channel 5; the direction of magnetization is perpendicular to the planar channel bed 5*d* of the main channel, and it also perpendicular to the flow of sample and buffer fluid along the main channel 5. Importantly, if the channel bed of the main channel is curved, then the permanent magnets 513 is configured to provide a magnetization in a direction which is perpendicular to a tangent to the apex of the curve of the channel; likewise or if the cross section of the main channel is v-shaped then the permanent magnets 513 is configured to provide a magnetization in a direction which is perpendicular to a tangent to the apex of the channel. Most preferably the means for generating a magnetic field 513, which in this example is the permanent magnet 513, has a cross section which is tapered in a direction towards the main channel 5. Preferably, the means for generating a magnetic field 513, which in this example is the permanent magnet 513, will be configured to provide a magnetization in a direction which is perpendicular to a longitudinal axis of the permanent magnet 513. Most preferably, the means for generating a magnetic field 513, which in this example is the permanent magnet 513, will be configured to provide a magnetization in a direction which is perpendicular to a longitudinal axis of the permanent magnet 513 and which is perpendicular to the plane of the pallet 3 of the microfluidic device.

The pneumatic systems 71*a*, 71*b* are then operated to provide respective a positive air flow and negative air flow. The pneumatic system 71*a* provides a positive air flow 50 to the elements 41*a-h* which are located on the first side 55*a* of the row of magnetic assemblies 44, and the pneumatic system 71*b* provides a negative air flow 51 to the elements 41*i-p* which are located on a second, opposite, side 55*b* of the row of four magnetic assemblies 44. When operated the pneumatic systems 71*a*, 71*b* cause the sample to flow out of respective sample source reservoirs 105 via the second conduit 12; along respective pairs of subsidiary inlet channels 6*a*,6*b*; along the respective main channels 5 (simultaneously with the buffer fluid) where ferromagnetic, paramagnetic (including super-paramagnetic), and/or diamagnetic particles are removed from the sample; and subsequently along respective pairs of outlet subsidiary channels 8*a*,8*b*; and from there into respective sample drain reservoirs 108 via respective fourth conduits 14. When operated the pneumatic systems 71*a*, 71*b* cause the buffer fluid to flow out of respective buffer source reservoirs 106 via the first conduit 11; along the main channel 5 (simultaneously with the buffer fluid) where the buffer fluid will receive ferromagnetic, paramagnetic (including super-paramagnetic), and/or diamagnetic particles which have been removed from the sample; and subsequently into respective buffer drain reservoirs 107 via respective third conduits 13.

The sample flowing into the respective main channels from the respective pairs of inlet subsidiary channels 6*a*,6*b* will form two streams 30*a*,30*b* of sample flowing in each respective main channel 5. Importantly as the depth 'd' of each of the pairs of inlet subsidiary channels 6*a*,6*b* is less than the depth 'f' of the respective main channels 5, along the main channel 5 between respective first and second junctions 7,9, buffer fluid 31 is interposed between each of the sample streams 30*a*,30*b* and the channel bed 5*d* of the main channel; also buffer fluid will be interposed between the two sample streams 30*a*,30*b*.

As the sample and buffer fluid simultaneously flow along the respective main channels 5, the magnetization provided in the region of the main channels 5 by the respective permanent magnetics 513 move the ferromagnetic, paramagnetic (including super-paramagnetic), and/or diamagnetic particles, which are contained in the sample, in a direction which is perpendicular to the flow of the sample and buffer fluid in the main channel and is also perpendicular to the channel bed 5*d* of the main channel, out of the sample and into a buffer fluid. In other words the ferromagnetic, paramagnetic (including super-paramagnetic), and/or diamagnetic particles, which are contained in the sample, are moved into the buffer fluid which is located between the sample and channel bed 5*d* of the main channel 5.

The ferromagnetic, paramagnetic (including super-paramagnetic), and/or diamagnetic particles may also be moved in a direction which is perpendicular to the flow of the sample and buffer fluid in the main channel and is parallel to the channel bed 5*d* of the main channel. In other words the ferromagnetic, paramagnetic (including super-paramagnetic), and/or diamagnetic particles, which are contained in the sample, may also moved into the buffer fluid which is interposed between the two sample streams 30*a*,30*b* flowing in the main channel 5.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. An interface component, suitable for cooperating with a microfluidic device, the interface component comprising,
one or more elements which can be selectively connected to a pneumatic system which can provide a positive and/or negative air flow to the one or more elements;
wherein each of the one or more elements comprises,
an input port which can be selectively fluidly connected to a pneumatic system; a flow restrictor arranged in fluid communication with the input port, wherein the flow restrictor can restrict the flow of fluid through the element; and an aerosol filter which is arranged to be in fluid communication with the flow restrictor; and
wherein the interface component further comprises one or more outlets, each of the one or more outlets being in fluid communication with a respective element, so that fluid can flow from the element out of the interface component via the one or more outlets; and wherein each of the one or more outlets can be selectively arranged to be in fluid communication with a respective reservoir of a microfluidic device, wherein the interface component further comprises one or more magnetic assemblies, each of the magnetic assemblies comprise,
a plunger, having a shaft wherein one end of the shaft is connected to a means for generating a magnetic field;
a biasing means which biases the shaft in a first direction; and
an electromagnet, which cooperates with the shaft, such that operating the electromagnet forces the shaft to move against in a second, opposite, direction, against the biasing force of the biasing means.

2. An interface component according to claim 1, further comprising a platform on which the one or more magnetic assemblies are supported and on which the one or more elements are supported; and wherein the one or more magnetic assemblies are configured such that when the shaft is moved in the second direction the means for generating a magnetic field is moved in a direction which is away from the platform, and when the shaft is moved in a first direction the means for generating a magnetic field is moved in a direction towards the platform.

3. An interface component according to claim 1, wherein the interface component comprises a plurality of magnetic assemblies arranged in a row on the platform and a plurality of elements are located on one side of the row and a plurality of elements are located on the other side of the row.

4. An interface component, suitable for cooperating with a microfluidic device, the interface component comprising, one or more elements which can be selectively connected to a pneumatic system which can provide a positive and/or negative air flow to the one or more elements;

wherein each of the one or more elements comprises, an input port Which can be selectively fluidly connected to a pneumatic system a flow restrictor arranged in fluid communication with the input port, wherein the flow restrictor can restrict the flow of fluid, through the element; and an aerosol filter which is arranged to be in fluid communication with the flow restrictor; and wherein the interface component further comprises one or more outlets, each of the one or more outlets being, in fluid communication with a respective element, so that fluid can flow from the element out of the interface component via the one or more outlets and wherein each of the one or more outlets can be selectively arranged to be in fluid communication with a respective reservoir of a microfluidic device, wherein the means for generating a magnetic field comprises a permanent magnet which has a tapered cross section.

5. An assembly comprising, a microfluidic device according to claim 1; and interface component according to any one of the above-mentioned interface components;

wherein one or more of the outlets of the interface component are arranged to be in fluid communication with a respective reservoir of the microfluidic device.

6. The assembly according to claim 5 further comprising, a pneumatic system which is operable to provide a positive air flow, and a pneumatic system which is operable to provide a negative air flow; and wherein the interface component comprises a row of magnetic assemblies, and elements located on opposite sides of the row of magnetic assemblies; and wherein elements located on one side of the row are fluidly connected to a pneumatic system which is operable to provide a positive air flow, and the elements which are located on the other opposite side of the row are fluidly connected to a pneumatic system which is operable to provide a negative air flow.

7. The assembly according to claim 5 wherein each of the one or more outlets of the interface component are arranged to be in fluid communication with a respective reservoir of a microfluidic device.

8. The assembly according to claim 7 wherein, at least a first outlet is in fluid communication with a sample source reservoir, and an element which is in fluid communication with said first outlet is fluidly connected to a pneumatic system which is operable to provide a positive air flow;

at least a second outlet is in fluid communication with a buffer source reservoir and an element which is in fluid communication with said second outlet is fluidly connected to a pneumatic system which is operable to provide a positive air flow;

at least a third outlet is in fluid communication with a sample drain reservoir, and an element which is in fluid communication with said third outlet is fluidly connected to a pneumatic system which is operable to provide a negative air flow;

at least a fourth outlet is in fluid communication with a buffer drain reservoir; and an element which is in fluid communication with said fourth outlet is fluidly connected to a pneumatic system which is operable to provide a negative air flow.

* * * * *